United States Patent
Ando et al.

(10) Patent No.: US 7,089,035 B2
(45) Date of Patent: Aug. 8, 2006

(54) WIRELESS OPERATING SYSTEM

(75) Inventors: Tanichi Ando, Kyoto (JP); Hideyuki Kobayashi, Kyoto (JP); Shinichi Mukaigawa, Kyoto (JP)

(73) Assignee: Omron Corporation, Kyoto (JP)

( * ) Notice: Subject to any disclaimer, the term of this patent is extended or adjusted under 35 U.S.C. 154(b) by 230 days.

(21) Appl. No.: 10/694,403

(22) Filed: Oct. 28, 2003

(65) Prior Publication Data

US 2005/0090252 A1   Apr. 28, 2005

(51) Int. Cl.
H04B 1/38   (2006.01)
(52) U.S. Cl. .................. 455/557; 455/556.1; 455/41.2
(58) Field of Classification Search ................ 455/557, 455/556.1, 41.2
See application file for complete search history.

(56) References Cited

U.S. PATENT DOCUMENTS

| | | | |
|---|---|---|---|
| 2004/0185857 A1* | 9/2004 | Lee et al. ................... | 455/445 |
| 2004/0248514 A1* | 12/2004 | Idani et al. ................ | 455/41.2 |
| 2004/0248569 A1* | 12/2004 | Kondou et al. .......... | 455/426.1 |
| 2005/0059430 A1* | 3/2005 | Beeman et al. ............ | 455/558 |
| 2005/0090297 A1* | 4/2005 | Yang et al. .............. | 455/575.3 |
| 2005/0101309 A1* | 5/2005 | Croome ..................... | 455/418 |

FOREIGN PATENT DOCUMENTS

| | | |
|---|---|---|
| JP | 10-093665 | 4/1998 |
| JP | 11-107592 | 4/1999 |
| JP | 11-285071 | 10/1999 |
| JP | 2000-091980 | 3/2000 |
| JP | 2001-040920 | 2/2001 |
| JP | 2001-077878 A | 3/2001 |
| JP | 2001-143032 A | 5/2001 |

* cited by examiner

Primary Examiner—Danh Cong Le
(74) Attorney, Agent, or Firm—Foley & Lardner LLP

(57) ABSTRACT

A wireless operating system, which is used with a mobile telephone, for wirelessly operating an operated target, includes: an adapter including transmitting means for allowing operation information required for an operation of the operated target to be transmitted by short distance radio; a short distance wireless unit having receiving means for receiving the operation information and operating means for operating the operated target in accordance with the received operation information; and an operated target control unit. The adapter further includes: communication means capable of performing direct communication with the mobile telephone by being carried with the mobile telephone; and operation information generating means for generating operation information in accordance with portable communication terminal information acquired from the mobile telephone. Under the circumstances where a user carries the mobile telephone, it is possible to provide a wireless operating system in which various operated targets and the mobile telephone are wirelessly operated.

11 Claims, 19 Drawing Sheets

WIRELESS OPERATING SYSTEM

FIELD OF THE INVENTION

The present invention relates to a wireless operating system in which under the circumstances where a user carries a portable communication terminal, various operated targets and the portable communication terminal itself are wirelessly operated.

BACKGROUND OF THE INVENTION

In recent years, a penetration rate of mobile telephones (portable communication terminals) has been increasing explosively, and a large number of people have owned mobile telephones. Under the circumstances where the mobile telephones are common among many people, allowing for various operations other than calling operation by means of mobile telephones makes the mobile telephones more useful.

Now, the mobile telephones have gone beyond merely communication devices, and they have become multifunction devices capable of performing various operations. It is conceived to operate other devices by making the most use of such processing capabilities. For example, there are the following conceivable operations: locking a door by means of a mobile telephone; utilizing a mobile telephone instead of showing a ticket; paying fees by means of a mobile telephone; and monitoring a state of something by means of a mobile telephone.

However, a conventional mobile telephone is connected to an external device via a mobile communication network so as to operate other device, so that a use fee (communication cost) of the mobile communication network is charged to operate other device. For example, an ordinary task such as unlocking a door by means of a mobile telephone takes a communication cost. Further, at such a place that access to the mobile communication network is impossible and at such a place that the use of a mobile telephone is banned, the operation using a mobile telephone is not available.

A conceivable method for solving such a problem is to incorporate a short distance wireless communications capability into a mobile telephone and operate other device by means of this communications capability. This can solve the problem of a communication cost charged for the ordinary task as described above. For example, consider that the operation of purchasing a canned drink from a vending machine is performed by means of a mobile telephone. The operating via the mobile communication network requires paying for a communication fee of the mobile telephone as well as a charge for the canned drink. On the other hand, the operation using the short distance wireless communication capability does not require paying such a communication fee.

However, there is the problem that those who can perform an operation by means of a mobile telephone including the short distance wireless communications capability are limited to users who purchase such a mobile telephone, and users who use ordinary mobile telephones cannot perform such an operation.

At the start of the service providing the operation of a device by means of a mobile telephone, this problem invites a situation where the great majority of people cannot use the service. Also, a service provider cannot expand a business of the service using a short distance wireless communications capability until many of the mobile telephone users purchase mobile telephones including the short distance wireless communications capability. Conceivably, additional investments for stimulation of the user's interest in renewing mobile telephones could be required for the improvement of such a situation.

Further, at the start of the service providing the operation of a device by means of a mobile telephone, in many cases, the short distance wireless communications capability is not included in operated targets, which could result in the limitation of an available operated target.

SUMMARY OF THE INVENTION

The present invention has been attained in view of the above problems, and an object of the present invention is to provide a wireless operating system in which under the circumstances where a user carries a portable communication terminal, various operated targets and the portable communication terminal itself are wirelessly operated, thereby offering conveniences to the user who uses the portable communication terminal.

A wireless operating system according to the present invention is a wireless operating system, which is used with a portable communication terminal, for wirelessly operating an operated target, and in order to solve the above problem, the system includes:

a transmitting-end device including transmitting means for allowing operation information required for an operation of the operated target to be transmitted by short distance radio; and a receiving-end device including receiving means for receiving the operation information and operating means for operating the operated target in accordance with the operation information received by the receiving means, the transmitting-end device including communication means capable of performing direct communication with the portable communication terminal by being carried with the portable communication terminal, and operation information generating means for generating the operation information in accordance with portable communication terminal information acquired from the portable communication terminal via the communication means.

Now, the mobile telephones have gone beyond merely communication devices, and they have become multifunction devices capable of performing various operations. It is conceived to operate other devices by making the most use of such processing capabilities. However, the portable communication terminal is basically connected to external device via a mobile communication network, and when the portable communication terminal operates other device via the mobile communication network, a use fee for the mobile communication network is charged. Further, even when the portable communication terminal makes connections to an external device via the portable communication network, it cannot operate an operated target that cannot be connected to the portable communication network.

In the above arrangement, the transmitting-end device includes: the communication means capable of performing direct communication with the portable communication terminal; and the operation information generating means for generating the operation information in accordance with portable communication terminal information acquired from the portable communication terminal via the communication means. Further, the receiving-end device includes: the receiving means for receiving the operation information; and the operating means for operating the operated target in accordance with the received operation information. With this arrangement, the operation information utilizing the capability of the portable communication terminal can be conveyed to the operated target without using the mobile communication network, so that it is possible to operate the operated target in accordance with the operation information. This makes it possible to operate the operated target without using the mobile communication network and to avoid a use fee for the mobile communication network to be charged. Providing the operating means of the operated target to the receiving-end device also allows for the operation of an operated target that conventionally cannot perform short distance wireless communications. Also, arranging the portable communication terminal not having short distance wireless communications capability so as to perform direct connection by connecting to the transmitting-end device allows the portable communication terminal to operate the operated target.

As a result of this, under the circumstances where a user carries a portable communication terminal, various operated targets can be wirelessly operated, thereby offering conveniences to the user who uses the portable communication terminal.

Further, a wireless operating system according to the present invention is preferably such that in the above-described wireless operating system, the portable communication terminal information is identification information unique to the portable communication terminal, the operation information includes the identification information, the receiving-end device includes storage means for storing the identification information and determination means for determining whether the identification information received by the receiving means is identical with the identification information stored in the storage means, and the operating means operate the operated target in accordance with a result determined by the determination means.

A portable communication terminal is usually used by an individual or limited people, so that it is possible to consider that the identification information of the mobile communication terminal indicates a user who uses the portable communication terminal. In the above arrangement, the transmitting-end device acquires and transmits this identification information. Then, in the receiving-end device, the determination means determines whether the identification information received by the receiving-end device is identical with the identification information stored in the storage means, and in accordance with the determined result, the operating means operate the operated target. Here, the transmitting-end device transmits the identification information to the receiving-end device by a short distance radio, so that the operated target is operated only when the user who carries the portable communication terminal and the transmitting-end device approaches the receiving-end device. That is, such a control operation becomes possible that the operated target is operated only when a particular person approaches the receiving-end device.

Further, a wireless operating system according to the present invention is preferably such that in the above-described wireless operating system, the transmitting means automatically transmit the operation information when the transmitting means become ready for communication with the receiving means.

In the above arrangement, without operating the portable communication terminal and the transmitting-end device carried with the user, the user can operate the operated target only by approaching the receiving-end device.

Further, a wireless operating system according to the present invention is preferably such that in the above-described wireless operating system, the portable communication terminal or the transmitting-end device includes input means for receiving an input for operating the operated target, and the transmitting means await an input to the input means before transmitting the operation information.

In the above arrangement, the operated target is operated only when the user has an intention to operate the operated target, so that it is possible to prevent unwanted operation.

Further, a wireless operating system according to the present invention is preferably such that in the above-described wireless operating system, the transmitting-end device includes transmitting-end device storage means for storing transmitting-end device identification information unique to the transmitting-end device, the operation information further includes the transmitting-end device identification information, the storage means of the receiving-end device further store the transmitting-end device identification information, the determination means determine whether the identification information and the transmitting-end device identification information which are received by the receiving means are identical with the identification information and the transmitting-end device identification information which are stored in the storage means, and the operating means operate the operated target in accordance with a result determined by the determination means.

In the above arrangement, in addition to the identification information of the portable communication terminal, it is determined whether the transmitting-end device identification information of the transmitting-end device is identical, and in accordance with the determined result, the operated target is operated. With this arrangement, even when either the portable communication terminal or the transmitting-end device is stolen, it is possible to prevent the operated target from being operated by illegal use.

Further, a wireless operating system according to the present invention is preferably such that in the above-described wireless operating system, the direct communication between the portable communication terminal and the transmitting-end device is wireless communication.

In the above arrangement, the portable communication terminal and the transmitting-end device can be separately kept and carried. This makes it possible to prevent the operated target from being operated by illegal use of portable communication terminal and the transmitting-end device stolen at once.

Further, a wireless operating system according to the present invention is preferably such that in the above-described wireless operating system, the portable communication terminal; and a center device capable of communication with the portable communication terminal via a communication network are included, the center device including center device receiving means for receiving the identification information and center device transmitting means for transmitting the received identification information via a communication network, and the receiving-end device including registration means for receiving identification information transmitted from the center device and storing the received identification information in the storage means.

In the above arrangement, the identification information of the portable communication terminal can be registered in the receiving-end device in such a manner that the user transmits the identification information of the portable communication terminal to the center device, utilizing a communication capability of the portable communication terminal, and the center device transmits the identification information to the receiving-end device. With this arrangement, in case that the operated target is a public object, for example, the user can register the identification information by means of the portable communication terminal. By using the center device, it is possible to permit the registration of the identification information only when predetermined conditions are met in the center device, and management of the users who operate the operated target becomes possible.

A wireless operating system according to the present invention is a wireless operating system for wirelessly operating a portable communication terminal, and in order to solve the above problem, the system includes:

a transmitting-end device including detecting means for detecting a state of a monitored target and transmitting means for allowing monitoring information indicating the state of the monitored target detected by the detecting means to be transmitted by short distance radio; and a receiving-end device including receiving means for receiving the monitoring information, operation information generating means for generating operation information for operating the portable communication terminal in accordance with the monitoring information received by the receiving means, and communication means for performing direct communication with the portable communication terminal by being carried with the portable communication terminal and transmitting the operation information to the portable communication terminal.

In the above arrangement, the operation information corresponding to the state of the monitored target is transmitted to the portable communication terminal, so that it is possible to operate the portable communication terminal in accordance with the state of the monitored target. At the time, as in the above-described wireless operating system, it is possible to avoid a use fee for the mobile communication network to be charged. In addition, it is possible to monitor a monitored target that that conventionally cannot perform short distance wireless communications. Also, arranging the portable communication terminal not having short distance wireless communications capability so as to perform direct connection by connecting to the receiving-end device allows the operation of the portable communication terminal.

As a result of this, under the circumstances where a user carries a portable communication terminal, the portable communication terminal can be wirelessly operated readily, thereby offering conveniences to the user who uses the portable communication terminal.

For a fuller understanding of the nature and advantages of the invention, reference should be made to the ensuing detailed description taken in conjunction with the accompanying drawings.

BRIEF DESCRIPTION OF THE DRAWINGS

FIG. 4(a) is a perspective view showing a board-type mobile telephone and a board-type mobile telephone adapter, FIG. 4(b) is a front view showing a mobile telephone and an adapter which are capable of wireless communication, and FIG. 4(c) is a front view showing a mobile telephone which is made up of a pen-type mobile telephone body and a headset, and an adapter capable of wireless communication with this mobile telephone.

FIG. 14(a) is a perspective view showing a short distance wireless unit connected to an operated target control units with the wirings respectively connected thereto, and FIG. 14(b) is a is a perspective view showing a short distance wireless unit connected to an operated target control units via an onboard LAN.

DESCRIPTION OF THE EMBODIMENTS

FIRST EMBODIMENT

The following will describe the First Embodiment of the present invention with reference to FIG. 1 through FIG. 15.

(System Configuration)

Figure 1:
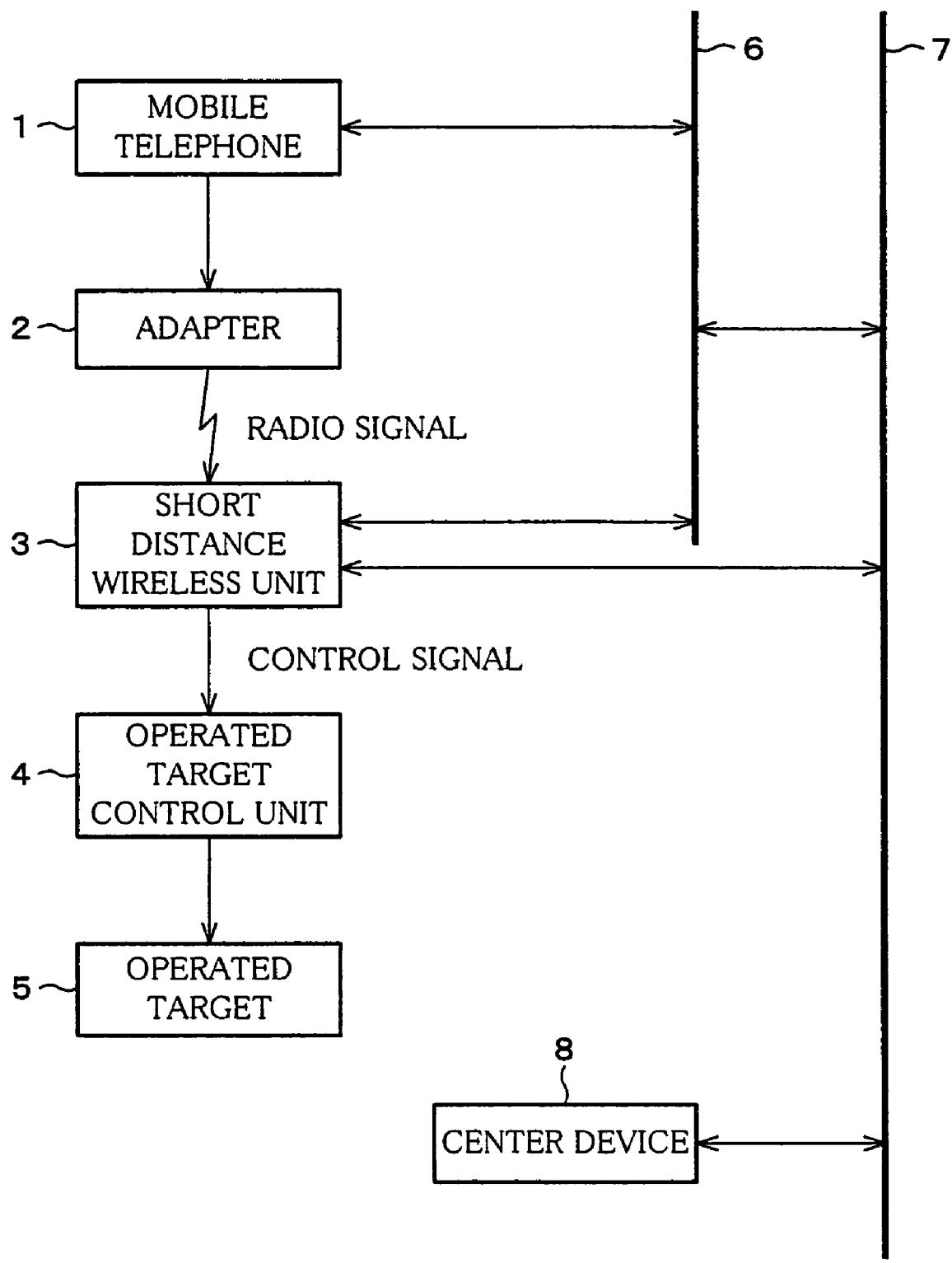
FIG. 1 is a schematic diagram showing a configuration of a wireless operating system according to the First Embodiment of the present invention.

FIG. 1 is a schematic diagram showing a configuration of a wireless operating system according to the present embodiment. The present wireless operating system, which is a system for operating an operated target 5, is primarily made up of a mobile telephone 1, an adapter 2, a short distance wireless unit 3, and an operated target control unit 4. In addition to these basic components, a mobile telephone communication network 6, a network 7 such as Internet, and a center device 8 may be included in the system.

The mobile telephone 1, which is connected to the mobile telephone communication network 6, is capable of data communications via the mobile telephone communication network 6. The mobile telephone communication network 6 is also connected to the network 7. The short distance wireless unit 3, which is connected to the mobile telephone communication network 6 or the network 7, may be capable of data communications. The center device 8, which is connected to the network 7, is capable of data communications via the network 7.

Here, the mobile telephone 1 and the adapter 2 are carried by a user of the present wireless operating system. In the present wireless operating system, the user can operate an operated target by means of the mobile telephone 1 and the adapter 2. At this moment, the adapter 2 and the short distance wireless unit 3 communicate with each other by short distance wireless radio. The short distance wireless unit 3 receives a radio signal transmitted from the adapter 2 and transmits a control signal to the operated target control unit 4. The operated target control unit 4 controls the operated target 5 in accordance with the control signal.

A service provider who provides a service using the present wireless operating system usually offers to the user the adapter 2, the short distance wireless unit 3, and the operated target control unit 4 and installs the center device 8 if necessary. For the use of the service, the user connects the mobile telephone 1 originally used by the user to the adapter 2 and attaches the operated target control unit 4 to the operated target 5. Note that, if the operated target 5 is a public object, the service provider may install the operated target control unit 4 to it.

The adapter 2, etc. may be offered from the service provider to the user by any of the following methods: selling them as articles, lending them with or without charge, or indirectly offering them via a third party.

The service provider may be either one business entity or a plurality of business entities. Examples of the service provider include a mobile telephone service provider.

The service offered to the user is to operate the operated target 5 by means of the mobile telephone 1, the adapter 2, the short distance wireless unit 3, and the operated target control unit 4 (the center device 8 may be included) working together.

Apart from human being, the conceivable user is any object such as animal, plant, machine, computer system, or robot. The user may be anything that can give an intention to operate the operated target 5 to the present wireless operating system through the operation of a switch, movement, traveling, change of state, etc.

(Structure of Mobile Telephone and Adapter)

Figure 2:
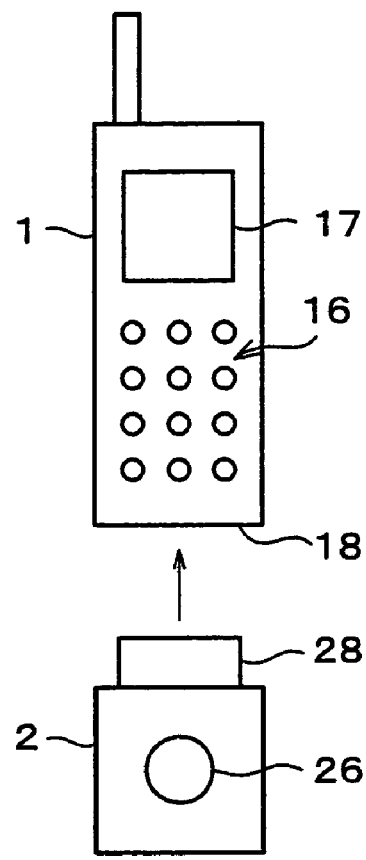
FIG. 2(a) and FIG. 2(b) are respectively front and perspective views showing an external appearance of a mobile telephone and an adapter used in the wireless operating system of FIG. 1.
Figure 2:
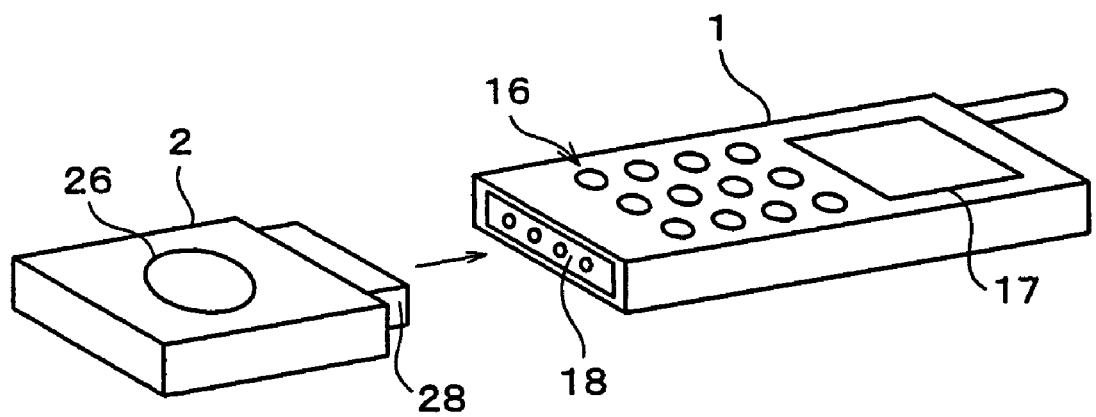

FIG. 2 shows an external appearance of the mobile telephone 1 and the adapter 2 according to the present embodiment, and FIG. 2(a) and FIG. 2(b) are front and perspective views of them, respectively.

The mobile telephone 1, which has capabilities of calling and data communications, includes a connector 18 for being connected to the adapter 2, an input key 16 made up of various button keys including numeric keypad and cross key, and an LCD (Liquid Crystal Display) 17. The adapter 2 in FIG. 2 includes a connector 28 for being connected to the connector 18 of the mobile telephone 1, and an operating section 26. Note that, the adapter 2 may not include the operating section 26.

Figure 3:
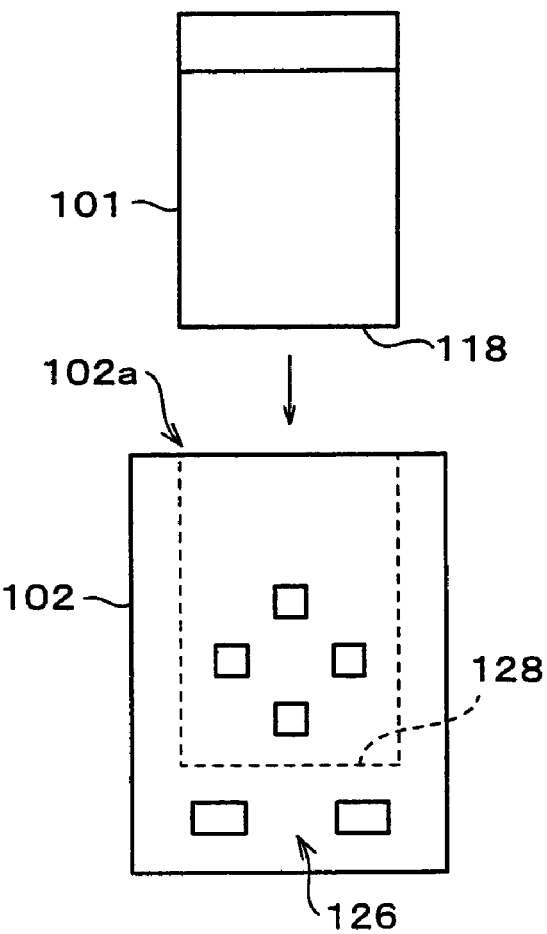
FIG. 3(a) and FIG. 3(b) are respectively front and perspective views showing an external appearance of a card-type mobile telephone and a card-type mobile telephone adapter used in the wireless operating system of FIG. 1.
Figure 3:
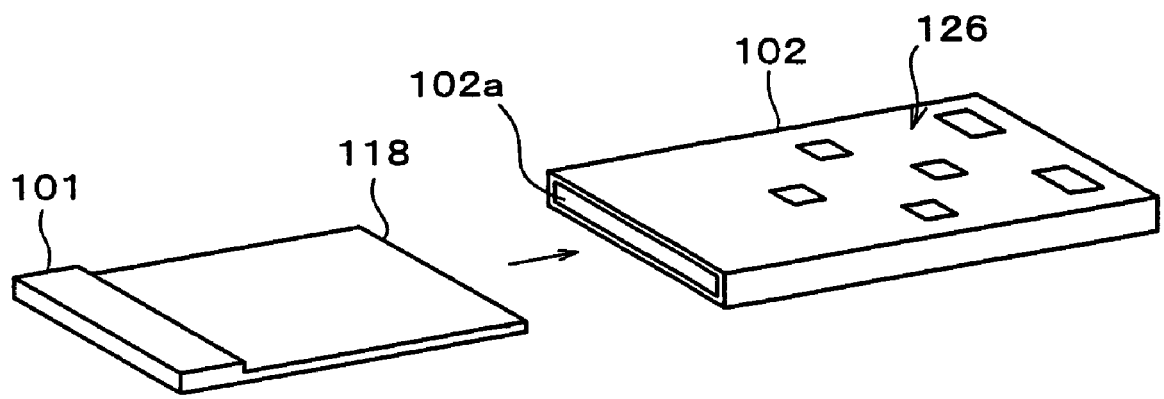

Note that, the mobile telephone 1 and the adapter 2 according to the present embodiment may be those shown in FIG. 3. FIG. 3 shows an external appearance of a card-type mobile telephone 101 and a card-type mobile telephone adapter 102 according to the present embodiment, and FIG. 3(a) and FIG. 3(b) are front and perspective views of them, respectively.

The card-type mobile telephone 101, which only has a capability of data communications without a capability of communications, includes a connector 118 for being connected to the adapter 102, such as PCMCIA (Personal Computer Memory Card International Association) interface, for example. The card-type mobile telephone adapter 102 includes a card slot 102a, a connector 128, which is provided inside the card slot 102a, for being connected to the connector 118 of the card-type mobile telephone 101, and an operating section 126.

Figure 4:
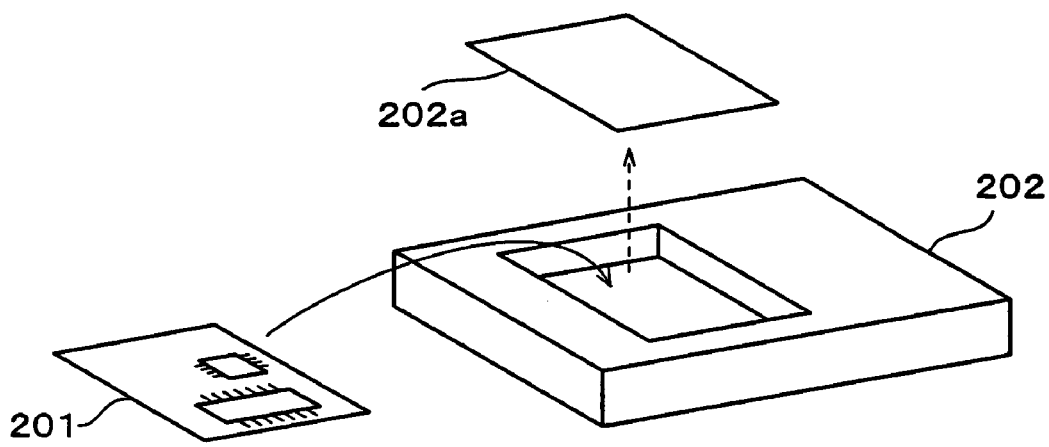
FIG. 4(a) through FIG. 4(c) are views showing other mobile telephones and adapters used in the wireless operating system of FIG. 1, where
Figure 4:
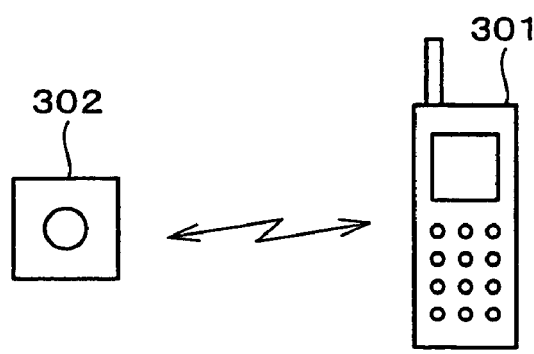
Figure 4:
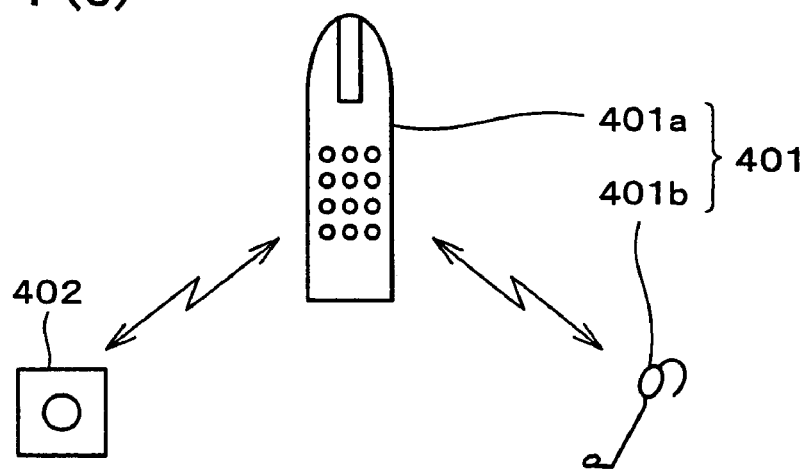

The mobile telephone 1 and the adapter 2 according to the present embodiment may be those shown in FIG. 4. FIG. 4(a) shows a board-type mobile telephone 201 and a board-type mobile telephone adapter 202. The board-type mobile telephone 201 can be incorporated into the board-type mobile telephone adapter 202 with a back cover 202a opened. FIG. 4(b) shows a mobile telephone 301 and an adapter 302 respectively differing from the mobile telephone 1 and the adapter 2 in FIG. 2 in that they are capable of wireless communications. FIG. 4(c) shows a mobile telephone 401 that is made up of a pen-type mobile telephone body 401a and a headset 401b, and an adapter 402 capable of wireless communications with the mobile telephone 401.

Note that, the following description will be given, assuming a mobile telephone and an adapter are the mobile telephone 1 and the adapter 2 in FIG. 2, respectively unless otherwise specified. However, alteration to other types of mobile telephone and adapter is also possible.

Figure 5:
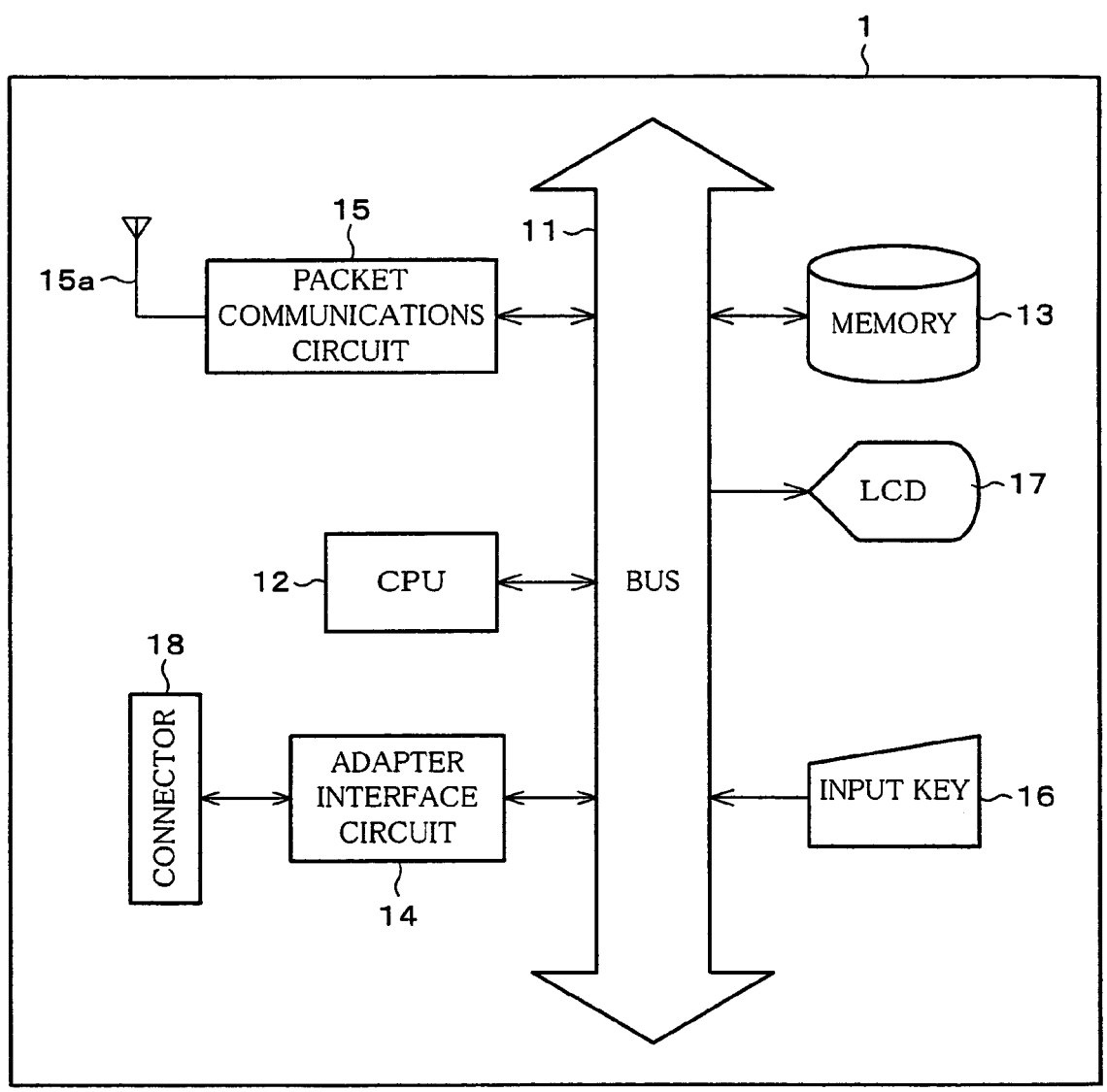
FIG. 5 is a block diagram showing an internal structure of a mobile telephone used in the wireless operating system of FIG. 1.

FIG. 5 is a block diagram showing an internal structure of the mobile telephone 1. The mobile telephone 1 has an arrangement in which a CPU (Central Processing Unit) 12, a memory 13, an adapter interface circuit 14, a packet communications circuit 15, and the input key 16, and the LCD (Liquid Crystal Display) 17 are connected to one another via a bus 11. To the adapter interface circuit 14, the connector 18 is connected.

The CPU 12 is made up of a microcomputer, for example, and performs various control operations of the mobile telephone 1 in response to the instructions from the user received through the input key 16 and to the instructions from various base stations.

The memory 13 is made up of a publicly known memory typified by RAM (Random Access Memory) and ROM (Read Only Memory), and stores various programs and data used by the CPU 12 as well as a telephone number database.

The adapter interface circuit 14 is an interface for carrying out data communications with the adapter 2, with the connector 28 of the adapter 2 connected to the connector 18.

The packet communications circuit 15 is a publicly known communications circuit for carrying out packet-based wireless telephone communications using an antenna 15a under the control of the CPU 12.

The input key 16 is made up of various button keys including numeric keypad and cross key, and is a publicly known interface through which the user inputs telephone numbers and various information.

The LCD 17 is a display section for displaying various messages in a visual manner to the user under the control of the CPU 12. The LCD 17 can also display telephone number information for a party at the other end of the line, and time information.

Note that, although omitted in FIG. 5, the mobile telephone 1 has a typical calling capability, so that the mobile telephone 1 also includes a microphone for picking up voices of a calling party and a speaker for outputting voices during a telephone call.

Figure 6:
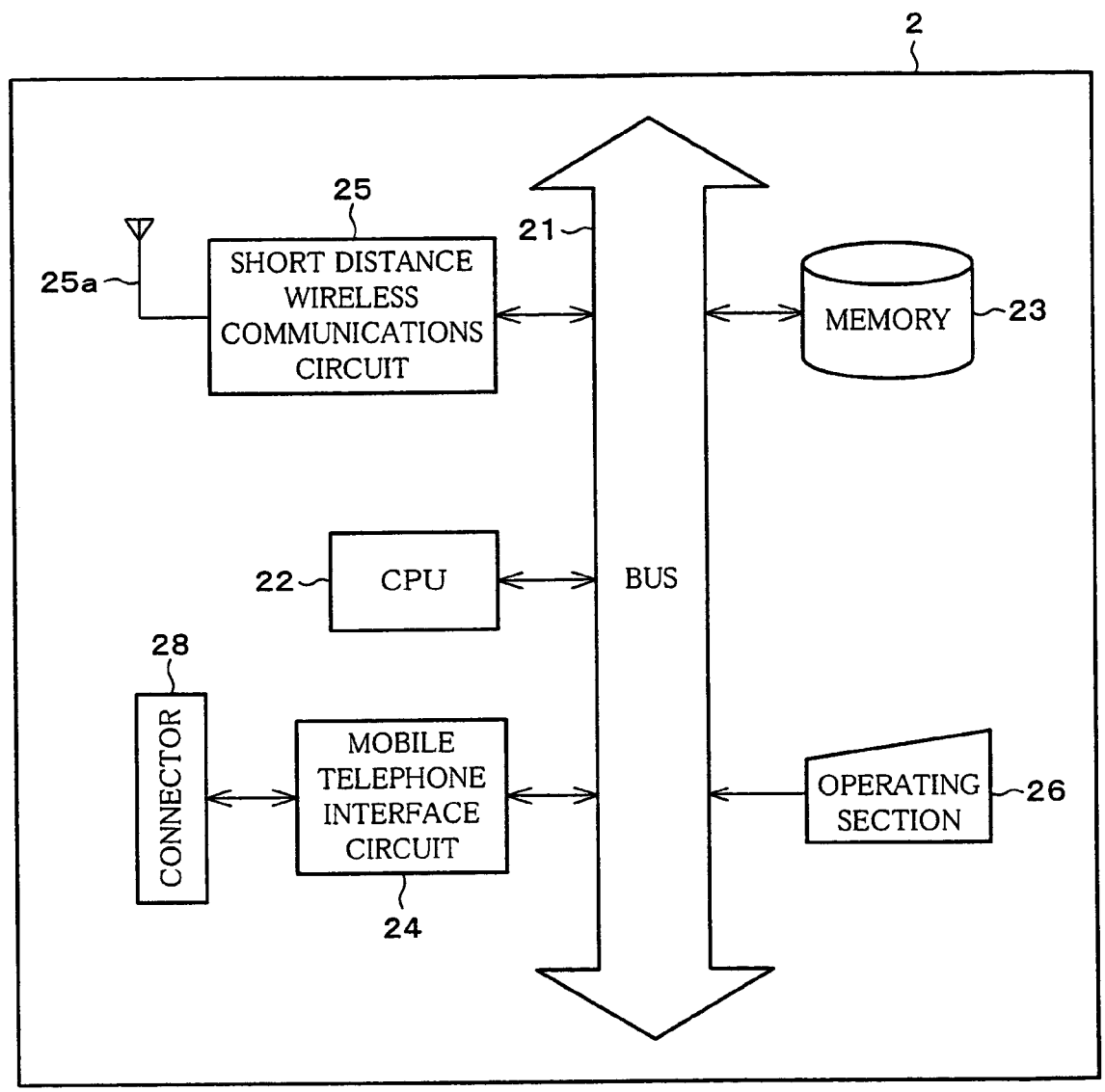
FIG. 6 is a block diagram showing an internal structure of an adapter used in the wireless operating system of FIG. 1.

FIG. 6 is a block diagram showing an internal structure of the adapter 2. The adapter 2 has an arrangement in which a CPU 22, a memory 23, a mobile telephone interface circuit 24, a short distance wireless communications circuit 25, and an operating section 26 are connected to one another via a bus 21. To the mobile telephone interface circuit 24, the connector 28 is connected. Note that, the adapter 2 may not include the operating section 26.

The CPU 22 is made up of a microcomputer, for example, and performs various control operations of the adapter 2 in response to the signals received from the mobile telephone 1 via the connector 28 and the mobile telephone interface circuit 24 and to the instructions from the user received through the operating section 26.

The memory 23 is made up of a publicly known memory typified by RAM and ROM, and stores various programs and data used by the CPU 22.

The mobile telephone interface circuit 24 is an interface for carrying out data communications with the mobile telephone 1, with the connector 18 of the mobile telephone 1 connected to the connector 28.

The short distance wireless communications circuit 25 is a publicly known communications circuit for short distance wireless communications under the control of the CPU 22, using an antenna 25a. As a short distance wireless communication system available is one using a weak radio wave or infrared ray over a 2.4-GHz (gigahertz), 11-Mbps LAN (Local Area Network) or Bluetooth® standards whereby under normal conditions, communications are possible over a distance of about tens to hundreds of meters indoors.

The operating section 26 may be anything that can convey user's intention to operate, such as operating switch, and by the user's operation of the operating section 26, the user's intention to operate can be inputted to the adapter 2. The operating switch may be a switch having a sensor function, such as photoelectric switch, other than a switch operated in a mechanical manner.

For example, other than the operating switch, the operating section 26 may be the following means: a means of detecting voices, such as microphone, and a means of recognizing the content of speech are provided as the operating section 26 to the adapter 2, whereby the user can express his/her intention to operate by inputting his/her voice. Further, a means of picking up shocks and vibrations and a means of detecting particular shocks and vibrations are provided as the operating section 26 to the adapter 2, whereby the user can express his/her intention to operate by giving a shock and a vibration to the adapter 2. Still further, a short distance wireless means, which operates independently from the short distance wireless communications circuit 25 for communicating with the operated target control unit 4 is mounted as the operating section 26 in the adapter 2, and the short distance wireless means is combined with a remote controller for use in the short distance radio, whereby the user can express his/her intention to operate by operating the remote controller. Yet further, a means of capturing image information from a CCD (Charge Coupled Device) camera or the like and determining the content of the captured image is provided as the operating section 26 to the adapter 2, whereby the user can express his/her intention to operate using an image. For example, by putting a hand over the CCD camera or making this means to recognize individual's feature such as face, fingerprints, palm prints, or patterns of animal's hair, the user's intention to operate can be expressed. Further, the CCD camera takes a picture image of a paper, whereby the user can express his/her intention to operate by writing characters or creating graphics on the paper. Still further, information that can be inputted as an image, such as a bar code identifiable by the system, is printed on a plate, whereby the user can express his/her intention to operate by presenting the plate in front of the CCD camera.

Providing the operating section 26 as described above allows for the operation by users who cannot master complicated operations, including a pet animal, an aged person, and a robot.

(Structure of Adapter Through Operated Target)

Figure 7:
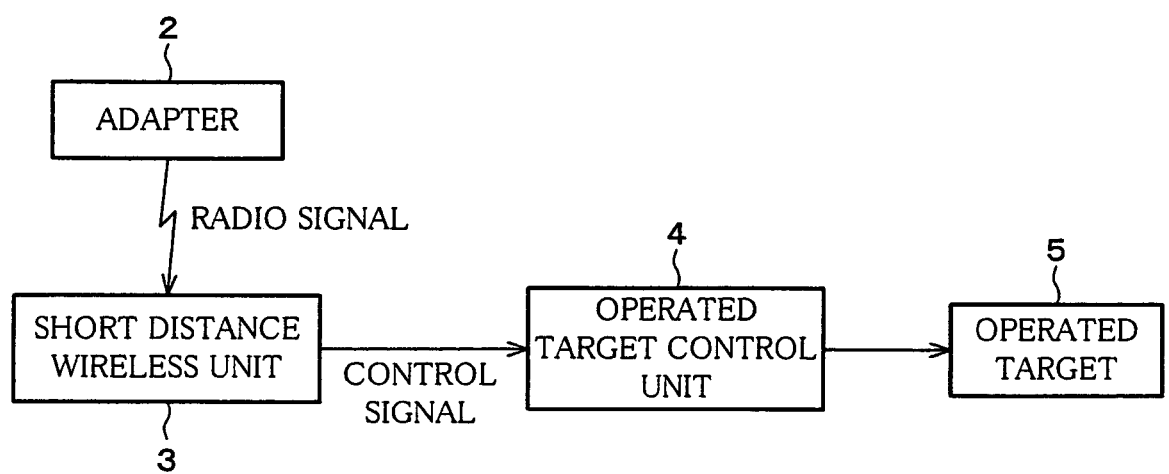
FIG. 7 is a block diagram showing relations of an adapter, a short distance wireless unit, an operated target control unit, and an operated target which are used in the wireless operating system of FIG. 1.

FIG. 7 is a block diagram showing relations of the adapter 2, the short distance wireless unit 3, the operated target control unit 4, and the operated target 5.

As described above, the adapter 2 and the short distance wireless unit 3 carry out data communications with each other by short distance radio, and a radio signal is transmitted from the adapter 2 to the short distance wireless unit 3. The short distance wireless unit 3 and the operated target control unit 4 are usually connected to each other via a cable, connector, or the like to carry out data communications, and a control signal is transmitted from the short distance wireless unit 3 to the operated target control unit 4. The operated target control unit 4 and the operated target 5 are connected in a different manner depending on the operated target 5, as described later.

Note that, the short distance wireless unit 3 and the operated target control unit 4 may be integrally structured. Apart from an electrical signal, the control signal may be a light signal or a radio signal.

The adapter 2 transmits a radio signal, and the short distance wireless unit 3 receives the radio signal. The radio signal contains information for operating the operated target 5 (operation information). The short distance wireless unit 3 converts the received radio signal into a control signal and transmits the control signal to the operated target control unit 4. The operated target control unit 4 controls each of the operated targets 5 in accordance with the control signal transmitted from the short distance wireless unit 3.

Figure 8:
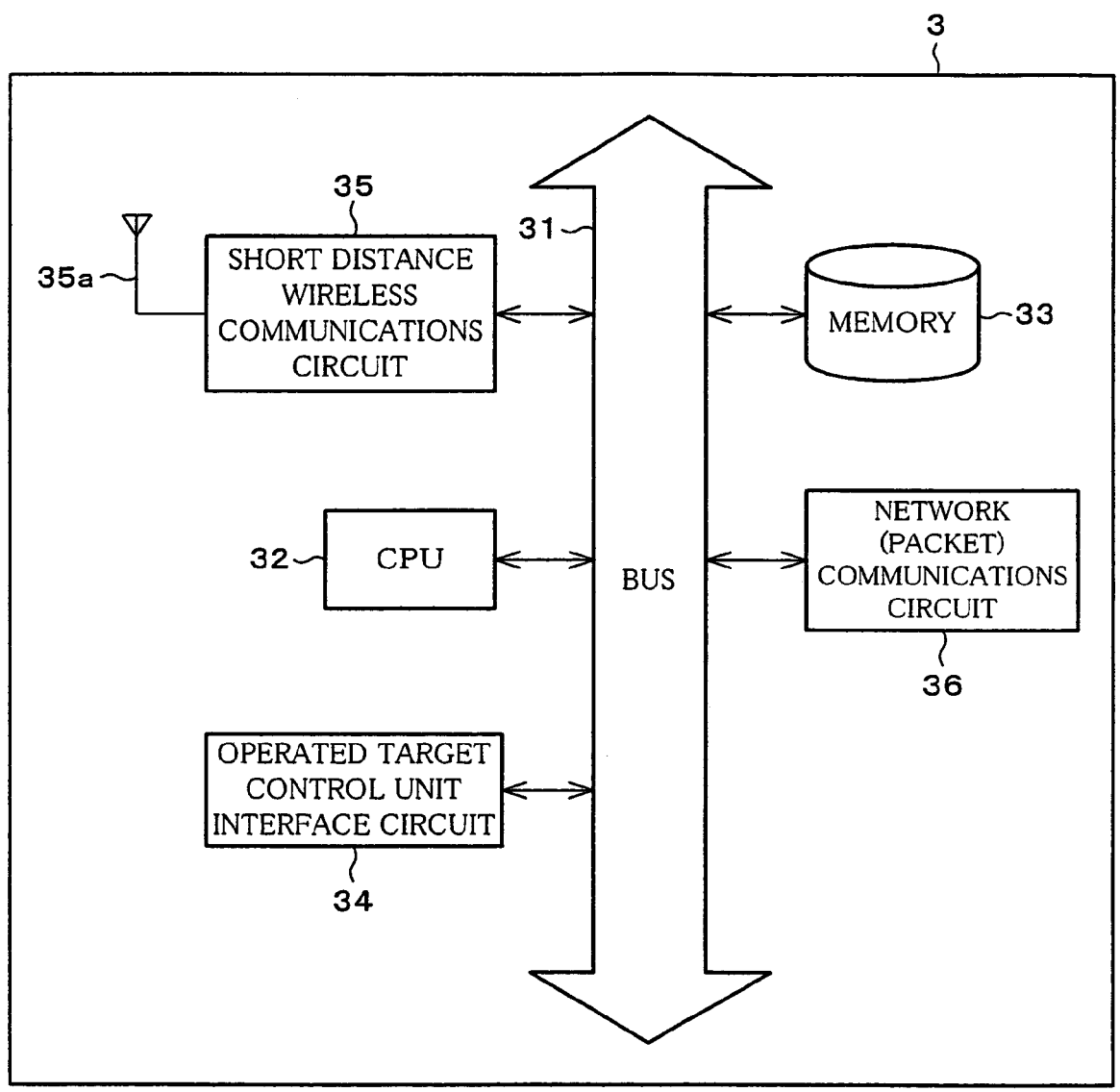
FIG. 8 is a block diagram showing an internal structure of a short distance wireless unit used in the wireless operating system of FIG. 1.

FIG. 8 is a block diagram showing an internal structure of the short distance wireless unit 3. The short distance wireless unit 3 has an arrangement in which a CPU 32, a memory 33, an operated target control unit interface circuit 34, and a network communications circuit 36 are connected to one another via a bus 31. The network communications circuit 36 may be unrequisite.

The CPU 32 is made up of a microcomputer, for example, and performs various control operations of the short distance wireless unit 3 in response to a radio signal received from the adapter 2 via an antenna 35a and a short distance wireless communications circuit 35, and transmits a control signal to the operated target control unit 4 via the operated target control unit interface circuit 34.

The memory 33 is made up of a publicly known memory typified by RAM and ROM, and stores various programs and data used by the CPU 32.

The operated target control unit interface circuit 34 is an interface for transmitting the control signal to the operated target control unit 4.

The short distance wireless communications circuit 35 is a publicly known communications circuit for carrying out short distance wireless communications using the antenna 25a under the control of the CPU 32.

The network communications circuit 36 is a publicly known communications circuit for carrying out data communications via the network 7 under the control of the CPU 32. Instead of the network communications circuit 36, a packet communications circuit for communicating via the mobile telephone communication network 6 may be provided.

Figure 9:
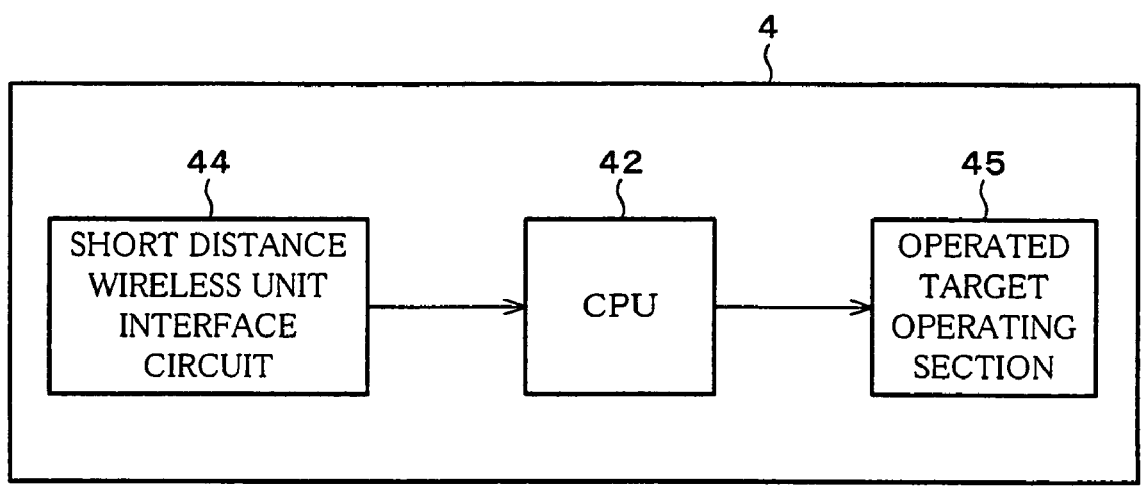
FIG. 9 is a block diagram showing an internal structure of an operated target control unit used in the wireless operating system of FIG. 1.

FIG. 9 is a block diagram showing an internal structure of the operated target control unit 4. The operated target control unit 4 has an arrangement in which a short distance wireless unit interface circuit 44 and an operated target operating section 45 are connected to each other via the CPU 42.

The CPU 42 is made up of a microcomputer, for example, and controls the operated target operating section 45 in accordance with a control signal received from the short distance wireless unit 3 via the short distance wireless unit interface circuit 44.

The operated target operating section 45 has a different arrangement depending on the operated target 5. For example, if the operated target 5 is controlled by means of a mechanical device such as a switch, a button, or a lever, the operated target operating section 45 includes a device such as an actuator and a solenoid to mechanically actuate the switch, the button, or the lever.

If the operated target 5 is electrically controlled, the operated target operating section 45 controls the operated target 5 by supplying a predetermined voltage and current to a predetermined circuit of the operated target 5. For example, operations involving a car including locking/unlocking operation of doors, opening/closing operation of windows, and opening operation of a trunk are conceivable.

If the operated target 5 is controlled by signals transmitted via a network such as LAN, the operated target operating section 45 transmits a signal, which is connectable to such a network, for controlling the operated target 5 via the network. For example, if the content on the web server is the operated target 5, operations including updating of the content are controlled in this manner.

If the operated target 5 is controlled by receiving a signal derived from a weak radio wave, a infrared ray, or the others, the operated target operating section 45 transmits such a signal.

If there is no means of directly controlling the operated target 5, and the operated target 5 can be controlled by an action from a living creature capable of receiving instructions, such as human being and animal, the operated target operating section 45 gives such instructions. For example, if the operated target 5 detects fingerprints of an operator for security management so as to work, the operated target 5 gives screen-displayed instructions or instructions by voice to a possible user to ask for the operation of the operated target 5, whereby the operated target 5 is caused to operate. In another case, if the operated target 5 is caused by a pet animal to perform an operation such as opening/closing operation of a gate only for pet animal, the operated target operating section 45 may give instructions by voice or other instruction to an animal to open the door.

Thus, the operated target operating section 45 has an arrangement accommodating the operated target 5.

Figure 10:
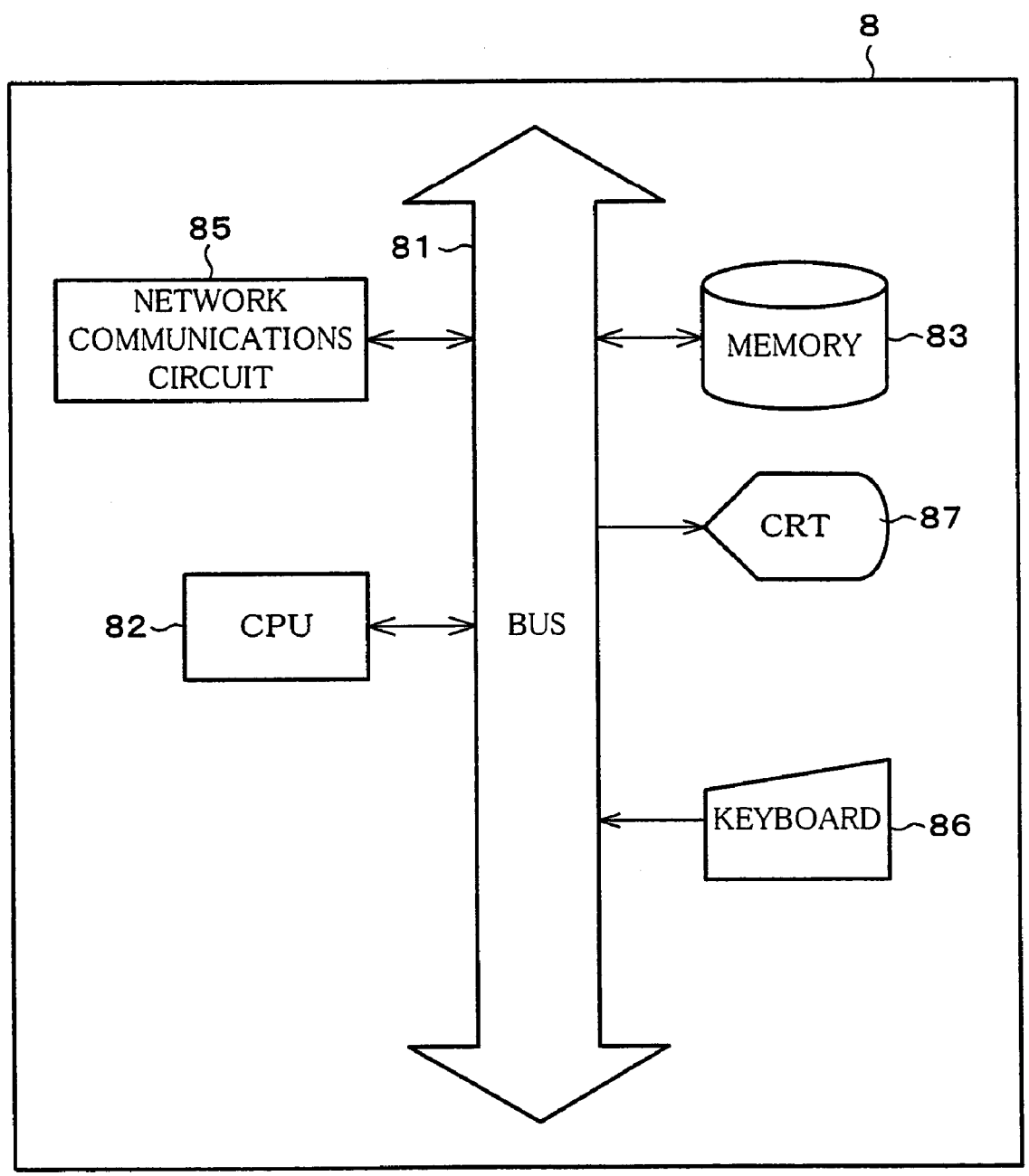
FIG. 10 is a block diagram showing an internal structure of a center device used in the wireless operating system of FIG. 1.

FIG. 10 is a block diagram showing an internal structure of the center device 8. The center device 8 has an arrangement in which a CPU 82, a network communications circuit 85, a memory 83, a CRT (Cathode Ray Tube) 87, and a keyboard 86 are connected via a bus 81.

The CPU 82 is made up of a microcomputer, for example, and controls the center device 8.

The network communications circuit 85 has a structure for communicating with the mobile telephone 1 and the short distance wireless unit 3 under the control of the CPU 82, and serves as interface with the outside of the center device 8.

The memory 83 is made up of a publicly known memory typified by RAM and ROM or a publicly known recording device typified by magnetic disk drive and optical disk drive, and stores various information under the control of the CPU 82.

The CRT 87 and the keyboard 86 are public known user interfaces by which a manager of the center device 8 gives various instructions to the center device 8 or confirms and modifies the content recorded in the memory 83.

As described above, the present wireless operating system, which is used with the mobile telephone 1 (portable communication terminal), is a system for wirelessly operating the operated target 5 and primarily has the following characteristics. That is, the present wireless operating system includes: the adapter 2 (transmitting-end device) including the short distance wireless communications circuit 25 and the antenna 25a (transmitting means) for allowing operation information required for the operation of the operated target 5 to be transmitted by short distance radio; the short distance wireless unit 3 (receiving-end device) including the antenna 35a and the short distance wireless communications circuit 35 (receiving means) for receiving the operation information; and the operated target control unit 4 (receiving-end device) including the operated target operating section 45 (operating means) for operating the operated target 5 in accordance with the operation information received by the short distance wireless communications circuit 35. The adapter 2 includes: the mobile telephone interface circuit 24 and the connector 28 (communication means) capable of direct communication with the mobile telephone 1 by being carried with the mobile telephone 1; and the CPU 22 (operation information generating means) for generating operation information in accordance with portable communication terminal information acquired from the mobile telephone 1 via the mobile telephone interface circuit 24 and the connector 28. Note that, the "direct communication" between the adapter 2 and the mobile telephone 1 is a communication performed between the adapter 2 and the mobile telephone 1 without using public lines.

With this arrangement, the operation information utilizing the capability of the mobile telephone 1 can be conveyed to the operated target without using the mobile telephone communication network 6, so that it is possible to operate the operated target in accordance with the operation information.

The following will describe specific examples of the present wireless operating system with reference to FIG. 1 and, FIG. 5 through FIG. 9. Note that, the operations of the mobile telephone 1, the adapter 2, the short distance wireless unit 3, the operated target control unit 4, and the center device 8 are controlled by the respective CPUs provided in these components.

(Specific Example 1 of the System)

Here, the following will describe a case where the present wireless operating system is used as an automatic lock operating system.

Figure 11:
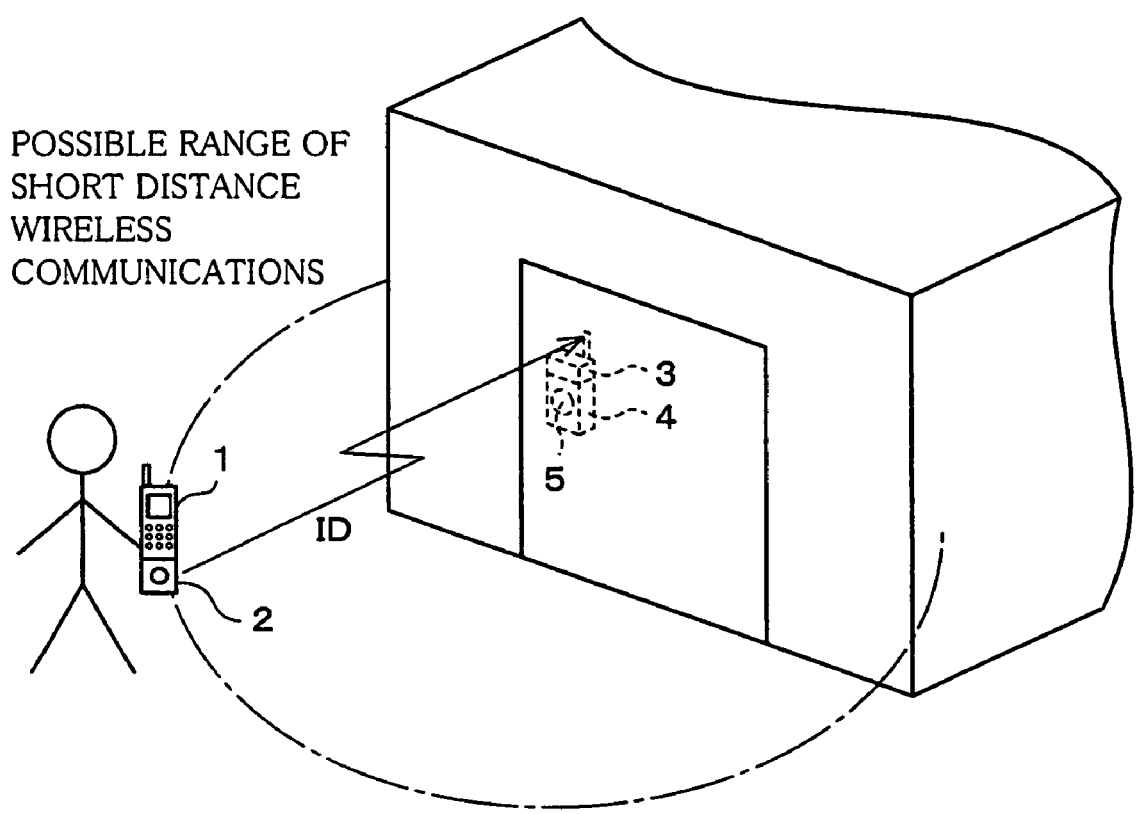
FIG. 11 is a schematic view showing a concept of an automatic lock operating system as a specific example of the wireless operating system of FIG. 1.
Figure 12:
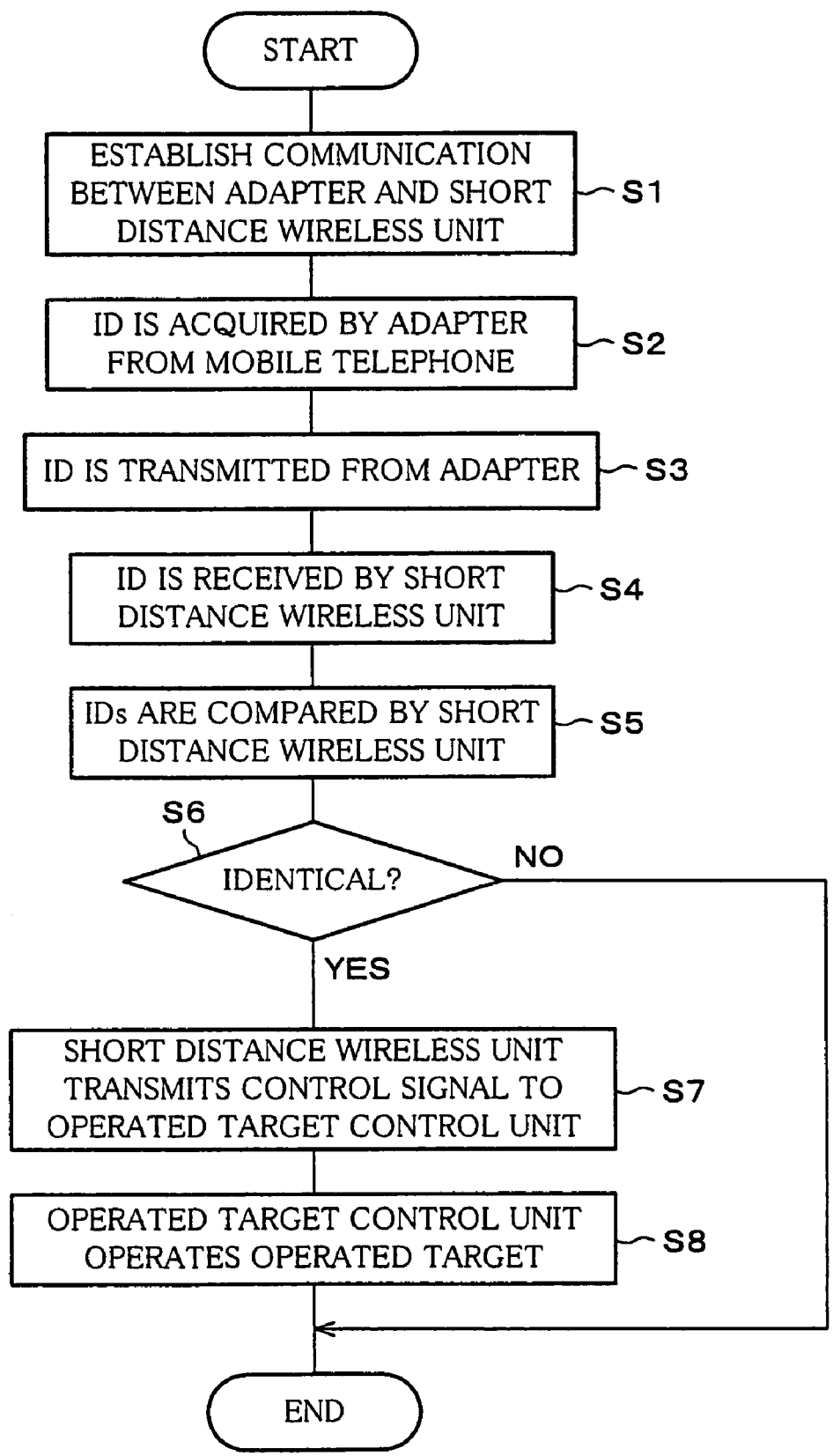
FIG. 12 is a flowchart showing a process flow of the automatic lock operating system as a specific example of the wireless operating system of FIG. 1.

FIG. 11 is a schematic view showing a concept of the automatic lock operating system. FIG. 12 is a flowchart showing a process flow of the automatic lock operating system.

This automatic lock operating system is used to automatically operate a lock of a front door in a house. In this case, the lock of the front door is the operated target 5. The operated target control unit 4 is mounted on the inner side of the front door so that the operated target operating section 45 can perform locking/unlocking operation by rotating a key pinch.

The front door is usually locked by the operated target control unit 4. When going out, the user carries the mobile telephone 1 with the adapter 2 connected thereto. When the user comes home from a visit and approaches the front door, short distance wireless communications become possible between the adapter 2 and the short distance wireless unit 3, whereby the communications are established (step S1).

When the communications between the adapter 2 and the short distance wireless unit 3 are established, the adapter 2 acquires an ID of the mobile telephone 1 from the mobile telephone 1 via the mobile telephone interface circuit 24 (step S2).

Here, as the ID of the mobile telephone 1, a telephone number or an e-mail address on the Internet of the mobile telephone 1 can be used. A telephone number and an e-mail address on the Internet is uniquely set to the mobile telephone 1 each, and the mobile telephone 1 is carried only by a particular person such as a user of the mobile telephone 1 and family members of the user, so that the telephone number or the e-mail address on the Internet of the mobile telephone 1 is advantageous to be used for the ID in this case. The telephone number or the e-mail address on the Internet as an ID is stored in advance in the memory 13 of the mobile telephone 1. Note that, the ID, not limited to a telephone number or an e-mail address on the Internet, may be anything that is uniquely set to the mobile telephone 1 each.

The adapter 2 transmits the ID acquired from the mobile telephone 1 from the short distance wireless communications circuit 25 to the short distance wireless unit 3 (step S3). In the short distance wireless unit 3, the ID transmitted from the adapter 2 is received by the short distance wireless communications circuit 35 (step S4).

The respective IDs of the mobile telephones 1 for the people allowed to enter the house (e.g. family members living in the house) are set in advance to the short distance wireless unit 3 and stored in the memory 33. When the short distance wireless unit 3 receives the ID from the adapter 2, the CPU 32 compares the received ID with the IDs stored in the memory 33 (step S5). As a result of comparison, the CPU 32 determines whether the received ID is identical with one of the IDs stored in the memory 33 (step S6).

If the received ID is identical with one of the IDs stored in the memory 33, the short distance wireless unit 3 transmits a control signal for releasing the lock of the front door from the operated target control unit interface circuit 34 to the operated target control unit 4 (step S7). In the operated target control unit 4, when the short distance wireless unit interface circuit 44 receives the control signal from the short distance wireless unit 3, the operated target operating section 45 release the lock of the front door so that the user can open the front door (step S8). Note that, the operated target control unit 4 is provided with a timer so that the front door is locked again after a lapse of a predetermined period of time since the front door is unlocked.

In step S6, if the CPU 32 in the short distance wireless unit 3 determines that the received ID is not identical with any of the IDs stored in the memory 33, the process is terminated without transmission of the control signal to the operated target control unit 4.

This automatic lock operating system eliminates the need for operating a lock with a key. This can prevent a young child from forgetting to lock the front door when he/she goes in or out. Moreover, the user can save the trouble of operating the lock of the front door when he/she comes home. Further, the automatic lock operating system eliminates the need for a keyhole provided on the outer side of the front door, so that it is possible to prevent a crime such as lock-picking crime.

As described above, in the present automatic lock operating system (wireless operating system), the adapter 2 acquires an ID (identification information) unique to the mobile telephone 1, as information (portable communication terminal information) acquired by the adapter 2 from the mobile telephone 1. The ID is included in information (operation information) that the adapter 2 transmits as a radio signal to the short distance wireless unit 3. The short distance wireless unit 3 includes the memory 33 for storing IDs (storage means), the antenna 35a, and the CPU 32 (determination means) for determining whether an ID received in the short distance wireless communications circuit 35 is identical with an ID stored in the memory 33. The operated target operating section 45 in the operated target control unit 4 operates the lock of the front door as the operated target 5 in accordance with a result determined by the CPU 32.

In this arrangement, the ID is transmitted by short distance radio. Therefore, the operated target 5 is operated only when the user who carries particular mobile telephone 1 and adapter 2 approaches the short distance wireless unit 3. That is, only when a particular person such as a family member comes home from a visit and approaches the short distance wireless unit 3, releasing the lock of the front door becomes possible.

Note that, in the automatic lock operating system, the short distance wireless communications circuit 25 in the adapter 2 automatically transmits an ID when the short distance wireless communications circuit 25 becomes ready for communication with the short distance wireless communications circuit 35 in the short distance wireless unit 3. Thus, when the user approaches the front door, the lock of the front door is automatically released. With this arrangement, the user can open the lock of the front door, without any operation of the mobile telephone 1 and the adapter 2 carried with the user, only by approaching the short distance wireless unit 3.

Further, the present invention may be arranged such that the mobile telephone 1 or the adapter 2 includes the input key 16 or the operating section 26 (input means) for receiving an input for releasing the lock of the front door, and the short distance wireless communications circuit 25 awaits the input to the input key 16 or the operating section 26 before transmitting the ID. That is, the present invention may be arranged such that the lock of the front door is released only when the user performs the operation for releasing the lock of the front door by means of the input key 16 in the mobile telephone 1 or the operating section 26 in the adapter 2. In this case, it is safe that in step S3, the adapter 2 is arranged so as to await the user's operation before transmitting the ID. Thus, operating the operated target 5 with the combination of multiple information (an ID and a command generated by the user's operation) can prevent an unwanted automatic release of the lock.

The automatic lock operating system provides a home security management. For the realization of a higher security level, it is desirable that a unique ID is also set in advance to the adapter 2.

Further, it is desirable to wirelessly perform data communications between the mobile telephone 1 and the adapter 2 so that the mobile telephone 1 and the adapter 2 can be kept and carried separately. In this case, as the arrangement shown in FIG. 4(*a*) or FIG. 4(*b*), the arrangement in which the mobile telephone 1 and the adapter 2 can communicate with each other without a mechanical connection between them may be adopted. In this arrangement, the mobile telephone 1 and the adapter 2 are provided with a capability realizing wireless communications between them.

In this case, the ID of the adapter 2 is stored in the memory 23 of the adapter 2. Also, the ID of the adapter 2 for the user who is allowed to enter the house is stored in the memory 33 of the short distance wireless unit 3. In step S3, the adapter 2 transmits the IDs of the mobile telephone 1 and the adapter 2 to the short distance wireless unit 3, and in step S5, the lock is released only when the IDs of the mobile telephone 1 and the adapter 2 are identical with the IDs stored in the memory 33.

With this arrangement, even when either the mobile telephone 1 or the adapter 2 is stolen, it is possible to prevent the operated target from being operated by illegal use. Further, the mobile telephone 1 and the adapter 2 can be separately kept and carried, so that it is not necessary that the mobile telephone 1 and the adapter 2 exist together in the same place. This can lower the risk of intrusion into the house due to illegal use of the mobile telephone 1 and the adapter 2 stolen at once.

Thus, it is preferable that the adapter 2 includes the memory 23 (transmitting-end device storage means) for storing an ID unique to the adapter 2 (transmitting-end device identification information), the ID of the adapter 2 is further included in the information (operation information) that the adapter 2 transmits as radio signal to the short distance wireless unit 3, the memory 33 of the short distance wireless unit 3 further stores the ID of the adapter 2, the CPU 32 of the short distance wireless unit 3 determines whether the received IDs of the mobile telephone 1 and the adapter 2 are identical with the IDs of the mobile telephone 1 and the adapter 2 which are stored in the memory 33, and the operated target operating section 45 of the operated target control unit 4 operates the lock of the front door in accordance with the determined result.

Further, it is preferable that direct communication between the mobile telephone 1 and the adapter 2 is wireless communication. Note that, in this case, instead of the connector 18 of the mobile telephone 1 and the connector 28 of the adapter 2, publicly known communication means for wireless communication using a weak radio wave is provided.

It is possible to arrange an automatic opening/closing system by adding a capability of automatically opening/closing a door to the above automatic lock operating system. Note that, the door is not limited to a front door, and a door in each room and a shutter of a garage are also regarded as the door. For opening/closing of a door, a door becomes the operated target 5. In this case, a mechanism by which a door can be opened/closed in combination with a motor and a gear is provided to the operated target operating section 45 of the operated target control unit 4. For opening/closing of an electric shutter, a shutter becomes the operated target 5. In this case, a circuit for controlling a power supply to a motor section of the shutter is provided to the operated target operating section 45 of the operated target control unit 4.

This automatic opening/closing system allows a door and the like to be automatically opened/closed without the operation of the mobile telephone 1 and the adapter 2, so that a user who cannot master the operation of the mobile telephone 1, such as pet animal, can also use this automatic opening/closing system. Apart from a pet animal, this automatic opening/closing system can be applied to an aged person, a cleaning robot not having highly sophisticated functions, and the others.

For example, consider that the mobile telephone 1 with the adapter 2 is attached to a cat. This can release a lock of a gate for pet animal and open its door when the cat comes to the gate, whereby the cat can enter the house without the operation by an owner of the cat. According to this arrangement, the door of the gate for pet animal does not open when other cat comes to the gate, so that it is possible to prevent other cat from entering the house. Similarly, when the cleaning robot enters a locked room, the lock is released automatically and the robot can enter the room to clean the room. Further, if the adapter 2 and the mobile telephone 1 are mounted on a vehicle, it can be arranged such that when the vehicle arrives home, a lock for a shutter of a garage is automatically released and the shutter automatically opens.

(Specific Example 2 of the System)

The above automatic lock operating system and automatic opening/closing system are primarily installed in a personal place such as a user's house. Therefore, a setting for IDs of the mobile telephone 1 and the adapter 2 can be made by the user's direct input to an input section, which is provided to the short distance wireless unit 3.

On the other hand, if the operated target 5 is public equipment such as an entrance gate to a facility, the user's direct input of an ID of his/her mobile telephone 1 to the short distance wireless unit 3 may be improper. Here, the case where the wireless operating system is used for such an entrance management system will be described.

This entrance management system includes the center device 8 and is adapted so that the network communications circuit 36 (or the packet communications circuit 36) in the short distance wireless unit 3 can perform data communications with the center device 8 via the network 7 (alternatively, the mobile telephone communication network 6 and the network 7).

Figure 13:
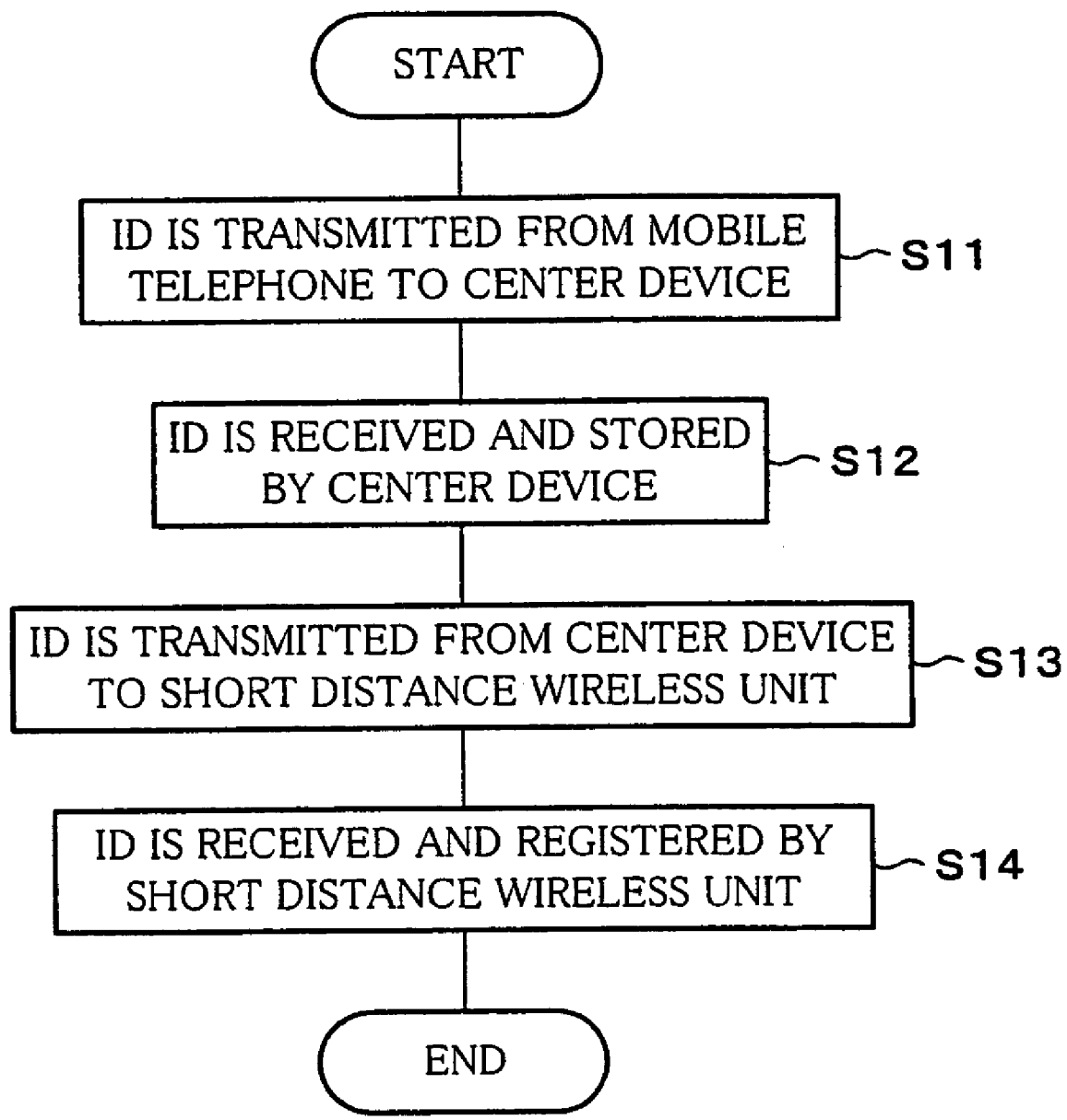
FIG. 13 is a flowchart showing a part of process flow of the entrance management system as a specific example of the wireless operating system of FIG. 1.

FIG. 13 is a flowchart showing a part of process flow of the entrance management system. In this entrance management system, when the user requests the center device 8 to register an ID, the center device 8 causes the ID of the mobile telephone 1 (alternatively, the ID of the adapter 2 or the IDs of the mobile telephone 1 and the adapter 2) to be stored in the short distance wireless unit 3 via the network 7.

For this purpose, the user first takes a step for registering the ID in the short distance wireless unit 3. In this step, the user causes the packet communications circuit 15 of the mobile telephone 1 to transmit the ID of the mobile telephone 1 to the center device 8 via the mobile telephone communication network 6 and the network 7 (step S11). Note that, in transmitting the ID of the mobile telephone 1, the mobile telephone 1 may transmit other information, e.g. name of the user, required for the admittance in the present entrance system, together with the ID of the mobile telephone 1.

In the center device 8, the network communications circuit 85 receives the ID and other information transmitted from the mobile telephone 1, and the received ID and other information are temporarily stored in the memory 83 (step S12). Here, the present invention may be arranged such that in the center device 8, the CPU 82 confirms that the conditions for the admission of the user of the mobile telephone 1 are met, e.g. required information such as name of the user is included, in accordance with the information received from the mobile telephone 1, and only when the conditions are met, the ID and other information are stored in the memory 83, and the process goes to the next step.

Next, the center device 8 transmits the ID temporarily stored in the memory 83 from the network communications circuit 85 to the short distance wireless unit 3 via the network 7 (step S13). In the short distance wireless unit 3, the network communications circuit 36 receives the ID transmitted from the center device 8, and the received ID is registered in the memory 33 of the short distance wireless unit 3 (step S14).

In this manner, the ID of the mobile telephone 1 for the user is registered in the short distance wireless unit 3. Subsequently, when the user approaches an entrance gate as the operated target 5, carrying the adapter 2 and the mobile telephone 1, the operated target control unit 4 opens the entrance gate after the same kind of steps as those in FIG. 12 are taken.

Thus, the present entrance management system includes the mobile telephone 1 and the center device 8 capable of communications with the mobile telephone 1 via the mobile telephone communication network 6 and the network 7 (communication network). The mobile telephone 1 includes the packet communications circuit 15 and the antenna 15*a* (portable communication terminal transmitting means) for transmitting the ID to the center device 8. The center device 8 includes the network communications circuit 85 (center device receiving means) for receiving the ID and transmitting the received ID via the network 7 (communication network). The short distance wireless unit 3 includes the CPU 32 (registration means) for receiving the ID transmitted from the center device 8 and causing the memory 33 to store the received ID.

With this arrangement, in case that the operated target 5 is a public object, the user can register the ID in the short distance wireless unit 3 by means of the mobile telephone 1. By using the center device, it is possible to permit the registration of an ID only when predetermined conditions are met in the center device 8, and management of the users who operate the operated target 5 becomes possible.

(Specific Example 3 of the System)

The above systems have been described, assuming that the operated target 5 is a single object. However, a plurality of operated targets 5 may be operated. The following will describe a vehicle operating system as an example of operating a plurality of the operated target 5 in the wireless operating system.

In the vehicle operating system, examples of the operated target 5 include a door lock, a security management system, a user-by-user vehicle's environment setting device, and an engine start lock. Here, the security management system is a system in which the state of a vehicle is managed by a sensor to protect the vehicle from theft, and when the sensor senses abnormality of the vehicle, such an action is taken as alerting, and reporting to a predetermined party. The user-by-user vehicle's environment setting device is a device for adjusting the environment of a vehicle, such as positions of the seats, height of the steering wheel, as the environment is set in advance for each user.

Figure 14:
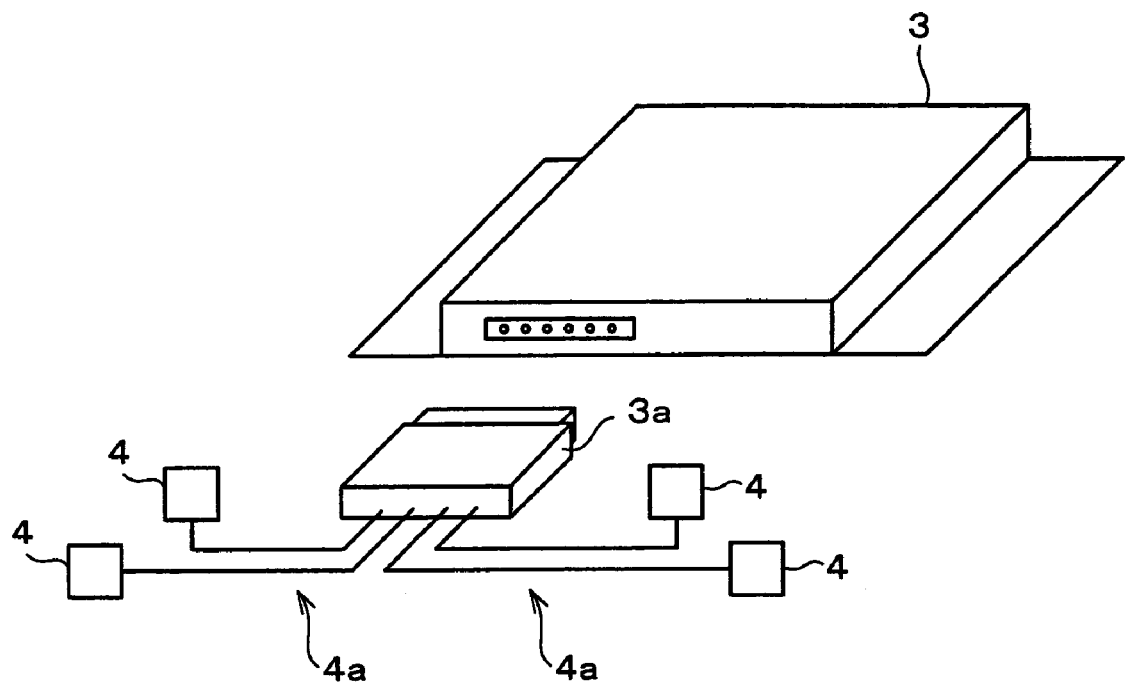
FIG. 14(a) and FIG. 14(b) are perspective views showing a specific example of a short distance wireless unit used in the wireless operating system of FIG. 1, where
Figure 14:
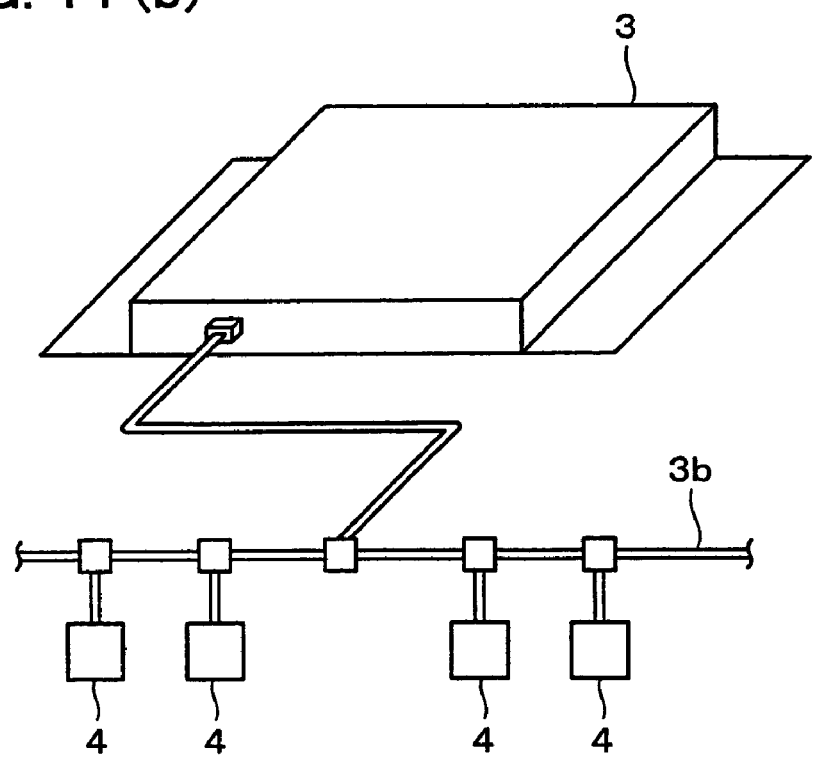

In this vehicle operating system, one short distance wireless unit 3 is provided in a vehicle, and the operated target control unit 4 is provided to the operated target 5 each. FIG. 14 is a perspective view showing an example of the short distance wireless unit 3. As shown in FIG. 14(*a*), the short distance wireless unit 3 may be connected via a connector 3*a* to the operated target control units 4 with the wirings 4*a* respectively connected thereto, or as shown in FIG. 14(*b*), the short distance wireless unit 3 may be connected to the operated target control units 4 via an onboard LAN 3*b*.

When the user approaches the vehicle, carrying the mobile telephone 1 together with the adapter 2, the same kind of steps as those in FIG. 12 are taken, and the operated target control units 4 which are respectively provided to the door lock, the security management system, and the engine start lock releases the door lock, the security management system, and the engine start lock. Note that, the operated target control unit 4 provided to the user-by-user vehicle's environment setting device performs settings for a vehicle's environment user by user in accordance with an ID obtained by the short distance wireless unit 3.

The user can perform the above operations without operating the input key 16 of the mobile telephone 1 and the operating section 26 of the adapter 2. That is, all the user has to do is to approach the vehicle with the adapter 2 and the mobile telephone 1 put in his/her pocket of clothes or in his/her bag, and it is not necessary to take the adapter 2 and the mobile telephone 1 out of the pocket or bag to operate them. In this vehicle operating system, thanks for the operated target control unit 4, the user can release the door lock and perform other operations with his/her hands free. Therefore, the user can perform releasing of the door lock, releasing of the security management system, the user-by-user vehicle's environment setting, and other operations with simple actions of approaching the vehicle, holding the doorknob and opening the door to get in the vehicle, and starting the engine to drive the vehicle. Apart from the above-mentioned operations, various operations necessary at the start of driving can be performed automatically, such as activation of a vehicle information system for offering information to the driver and passengers, including a navigation system, notification of the start of driving to a monitoring center, and requesting to offer services.

Further, the vehicle operating system can offer a service by operating the vehicle while the user is in the vehicle. For example, a conceivable service is a service of displaying the arrival of an e-mail on a meter panel or the like of the vehicle when the mobile telephone 1 receives an e-mail while the user is in the vehicle.

Figure 15:
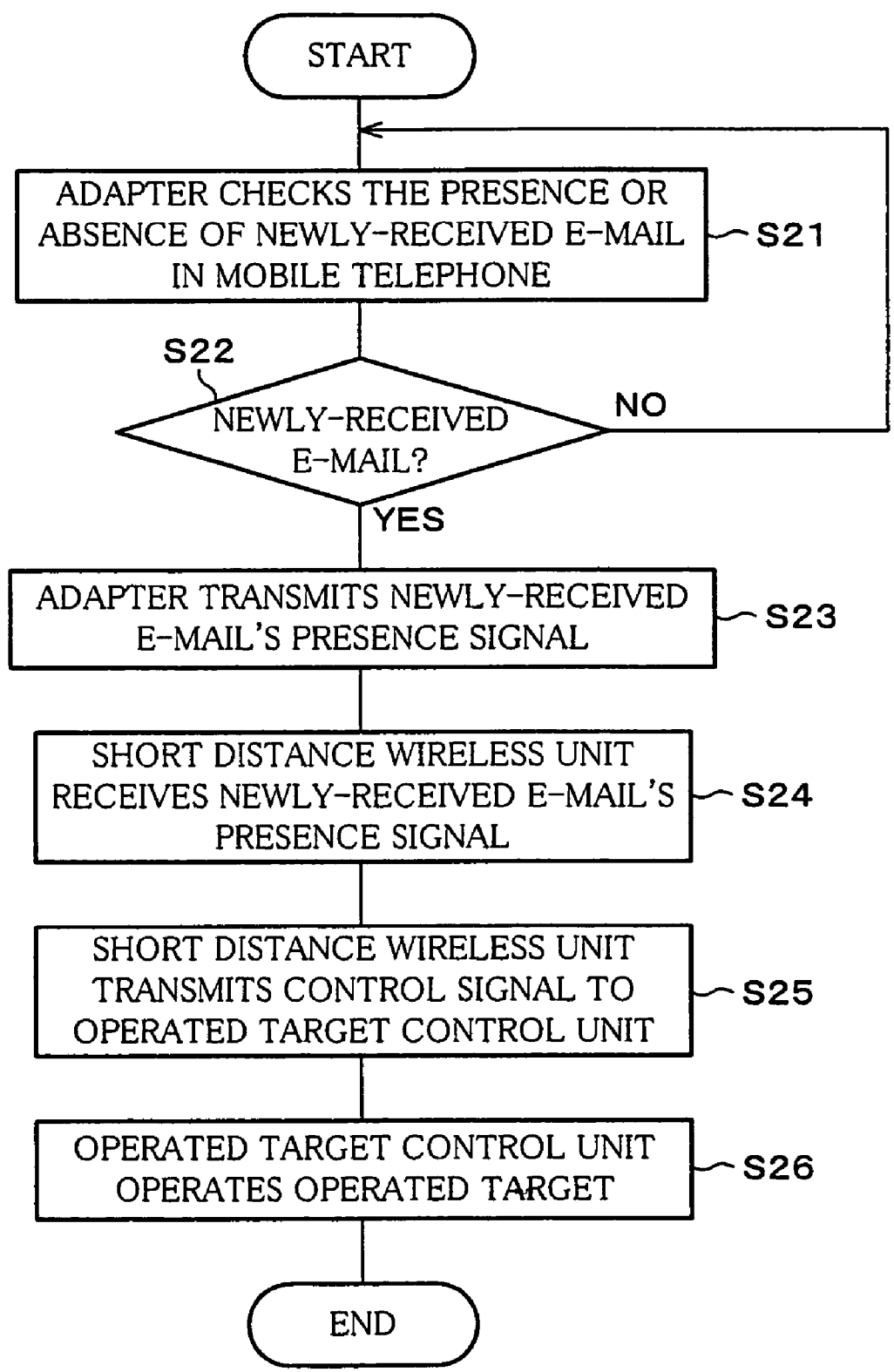
FIG. 15 is a flowchart showing a flow of the process for displaying the arrival of an e-mail on a meter panel of a vehicle in a vehicle operating system as a specific example of the wireless operating system of FIG. 1.

FIG. 15 is a flowchart showing a process flow for displaying the arrival of an e-mail on a meter panel of the vehicle in the vehicle operating system. In this case, the operated target 5 is a meter panel of the vehicle and, the meter panel is capable of displaying an indication that there is a newly-received e-mail.

In this vehicle operating system, the adapter 2 causes the CPU 22 to check whether the mobile telephone 1 has newly received an e-mail (step S21) and determine the presence or absence of a newly-received e-mail (step S22). If there is no newly-received e-mail, the step S21 is repeated at predetermined intervals. If there is a newly-received e-mail, the CPU 22 in the adapter 2 generates a newly-received e-mail's presence signal indicating that there is a newly-received e-mail, and the newly-received e-mail's presence signal is transmitted from the short distance wireless communications circuit 25 to the short distance wireless unit 3 (step S22). In the short distance wireless unit 3, the short distance wireless communications circuit 35 receives the newly-received e-mail's presence signal (step S23), and the operated target control unit interface circuit 34 transmits a control signal for displaying an indication that there is a newly-received e-mail on the meter panel of the vehicle as the operated target 5, to the operated target control unit 4 (step S25). In the operated target control unit 4, the short distance wireless unit interface circuit 44 receives the control signal, and the operated target operating section 45 causes the meter panel of the vehicle as the operated target 5 to display the indication that there is a newly-received e-mail (step S26).

With this vehicle operating system, the user can know that the mobile telephone 1 has received an e-mail, without looking away from the front and the meter panel while driving the vehicle. Note that, apart from displaying the indication that there is a newly-received e-mail on the meter panel, the presence of the newly-received e-mail may be announced by voice by means of audio equipment in the vehicle. In this case, the audio equipment is the operated target 5.

(Offering of a Service Using the Present System)

As described above, the service provider using the present wireless operating system offers to the user the adapter 2, the short distance wireless unit 3, and the operated target control unit 4, whereby the user can receive a service of allowing the mobile telephone 1 originally used by the user to operate the operated target 5.

In a conventional service using a mobile telephone, the user needed to operate the mobile telephone. The mobile telephone had to provide extremely complicated operations, as compared to a mobile telephone only handling incoming and outgoing calls. Therefore, in order to receive the service, the user needed to master the complicated operations of the mobile telephone. This might be a big trouble especially for children and aged people. Also for general users, there are such inconveniences that it takes much time to operate the mobile telephone, and they cannot make it in time when they are in a hurry.

In addition, in the conventional service, the operations available for the user was limited depending on the facilities of the mobile telephone. Therefore, the user who used a mobile telephone without a short distance wireless communications capability had to buy a new mobile telephone so as to receive the service.

The service using the present wireless operating system can solve the above-mentioned inconveniences. This wireless operating system can offer operational convenience to the user and expand the range of services offered and the geographical coverage of the area where services are offered. This makes it possible to provide a value-added mobile telephone and develop such an extremely big business of a comparable size to a mobile telephone business.

In the present wireless operating system, the operated target is operated by the mobile telephone 1, the adapter 2 of a short distance wireless communications capability, the short distance wireless unit 3, and the operated target control unit 4 working together. This allows the user to receive the services that are not available in the system only combining a mobile telephone and an adapter.

As to the arrangement of the adapter 2, by bringing the connector 28 and the mobile telephone interface circuit 24 of the adapter 2 into correspondence with the connector 18 and the adapter interface circuit 24 of the mobile telephone 1, i.e. by adapting the adapter 2 to the model of the mobile telephone 1, it becomes adaptable to any model of the mobile telephone 1. In addition, the adapter 2 can be provided as a product retrofitted, so that it is possible to offer the adapter 2 to the user after the mobile telephone 1 is released to the market. Therefore, it is possible to use the mobile telephone 1 previously purchased.

By combining this adapter 2, the short distance wireless unit 3, and the operated target control unit 4 to operate the operated target 5, it is possible to offer a very wide range of services to the user. For example, only adding the operated target control unit 4 in accordance with the operated target 5 makes it possible to flexibly expand the range of services offered and the geographical coverage of the area where services are offered.

With the present wireless operating system, operating the operated target 5 using plural kinds of information that cannot be detected only by one of the mobile telephone 1, the adapter 2, and the short distance wireless unit 3 makes it possible to offer various conveniences to the user (Convenience).

For example, with the present wireless operating system, it is possible to operate the operated target 5 automatically instead of the user and to offer services in accordance with whether the user approaches or leaves and whether or not the user comes to a certain location. Therefore, the user can realize to operate the operated target 5 with his/her hands free, without the touch of hands on the operated target 5. At the moment, using the present wireless operating system makes it possible to make good use of information that cannot be obtained only by one of the mobile telephone 1 and the adapter 2, thereby allowing for offering enhanced convenience.

In case of the operation due to internal circumstances of the user, it is possible to operate the operated target 5 with one action for conveying the operation. This function makes it possible to offer services without losing the convenience when confirmation of the user's intention is required. In case that operations are needed for a plural number of times for the procedure for offering services, only minimum necessary operations for indicating the user's intention at the moment enables the user to receive services.

With the present wireless operating system, it is possible to offer a new service by retrofitting the adapter 2 to the existing mobile telephone 1, so that it is possible to add a new service without a large alteration of the existing system (Extensibility of services).

For example, with the present wireless operating system, it is possible to directly use the existing mobile telephone 1 without alteration in its shape, structure, software, and communication scheme. Therefore, for the user, there are such advantages as avoiding the need to renew the mobile telephone 1 and allowing for the use of the existing mobile telephone 1 even when the operated target 5 is newly added. For the service provider, there are such advantages as avoiding the need to newly offer the mobile telephone 1 when a new service is offered to the user, allowing for the use of the existing mobile telephone 1 even when the operated target 5 is newly added, and allowing for widening the scope of application of the adapter 2 by adding the operated target control unit 4 one after another.

The present wireless operating system is available, provided that the operated target 5 is operable externally. Therefore, it is not necessary to incorporate specified circuits and devices into the operated target 5. Consequently, it is possible to offer a new service with little changes or without any changes to the operated target 5.

The present wireless operating system is applicable to a very wide range of services by combining the mobile telephone 1 with the adapter 2 of a simple structure and the short distance wireless unit 3 so as to be highly associated components. (Widening of the scope of application)

For example, with the present wireless operating system, even if the mobile telephone 1 cannot communicate with the mobile telephone communication network 6 on the spot, it is possible to operate the operated target 5. This drastically widens an applicable scope of services.

With the present wireless operating system, it is possible to increase types of the operated target 5 by adding the operated target control unit 4 one after another. This widens an area available for the service. For example, when the user who has received a home-use service attaches the short distance wireless unit 3 and the operated target control unit 4 to his/her vehicle, it is possible to receive services both in the house and in the vehicle.

With the present wireless operating system, the object to which user's intention of operating is conveyed is not limited to the mobile telephone 1 or the operated target 5, so that it is possible to operate the operated target 5 without directly conveying an intention of operating the operated target 5. Therefore, the service provider offers the adapter 2, the short distance wireless unit 3, and the operated target control unit 4 to the user in accordance with user's ability of conveying his/her intention to operate, so that it is possible to increase types of the user up to a pet animal, an aged person, a robot, and others. In addition, increasing types of the user can dramatically increase the market size of a service business.

With the present wireless operating system, types of the operated target 5 operable are increased. The present wireless operating system has the short distance wireless unit 3 and the operated target control unit 4, so that it is possible to operate the operated target 5 that has not been operable in the conventional service. For example, when the present wireless operating system is applied to a home security service, it becomes possible to automatically open/close a lock and windows in the house with hands free. In addition, it becomes possible to release a door lock of a vehicle with hands free. Further, when the present wireless operating system is combined with a home security service, it is also possible to automatically open/close a shutter of a garage.

SECOND EMBODIMENT

The following will describe the Second Embodiment of the present invention with reference to FIG. 16 through FIG. 19. Note that, members having the same functions and features as those described in the First Embodiment are given the same reference numerals and explanations thereof are partially omitted here.

(System Configuration)

Figure 16:
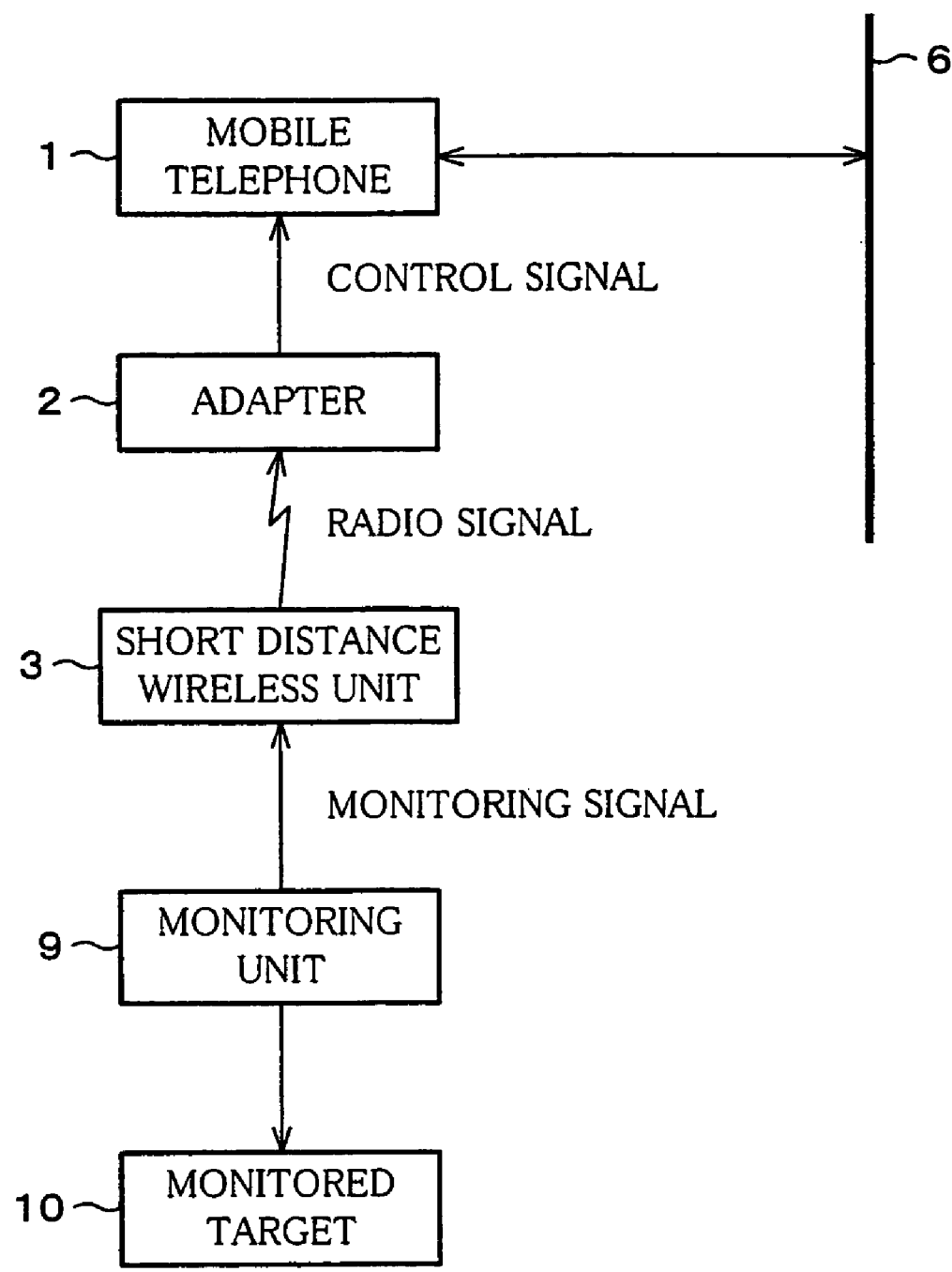
FIG. 16 is a schematic diagram showing a configuration of a wireless operating system according to the second embodiment of the present invention.

FIG. 16 is a schematic diagram showing a configuration of a wireless operating system according to the present embodiment. The present wireless operating system, which is a system for operating a mobile telephone 1, is made up of the mobile telephone 1, an adapter 2, a short distance wireless unit 3, and a monitoring unit 9.

Here, the mobile telephone 1, the adapter 2, and the short distance wireless unit 3 basically have the same features as those described with reference to FIGS. 5, 6, and 8, respectively. However, in the present wireless operating system, a signal is transmitted in such an opposite direction that the monitoring unit 9 transmits a monitoring signal to the short distance wireless unit 3, the short distance wireless unit 3 transmits a radio signal to the adapter 2, and the adapter 2 transmits a control signal to the mobile telephone 1.

Figure 17:
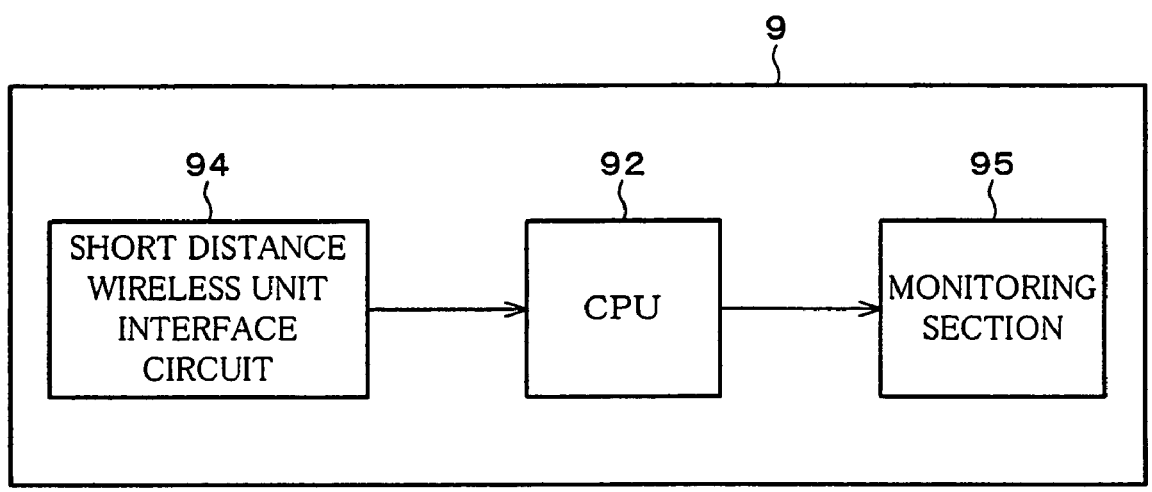
FIG. 17 is a block diagram showing an internal structure of a monitoring unit used in the wireless operating system of FIG. 16.

FIG. 17 is a block diagram showing an internal structure of the monitoring unit 9. The monitoring unit 9 has an arrangement in which a short distance wireless unit interface circuit 94 and a monitoring section 95 are connected via a CPU 92.

The CPU 92, which is made up of e.g. a microcomputer, acquires monitoring information indicating the state of a monitored target 10 from the monitoring section 95 and transmits a monitoring signal including the monitoring information from the short distance wireless unit interface circuit 94 to the short distance wireless unit 3.

The monitoring section 95 has a different arrangement depending on the monitored target 10. For example, if the state of the monitored target 10, e.g. whether or not the monitored target 10 is operating, can be determined in accordance with the position of a mechanical device such as a switch, a button, and a lever provided in the monitored target 10, the monitoring section 95 may be anything that can detect the position of the mechanical device such as a switch, a button, and a lever. If the state of the monitored target 10 can be detected electrically, the monitoring section 95 may be anything that can perform such an electrical detection. Thus, the monitoring section 95 has an arrangement corresponding to the monitored target 10.

Figure 18:
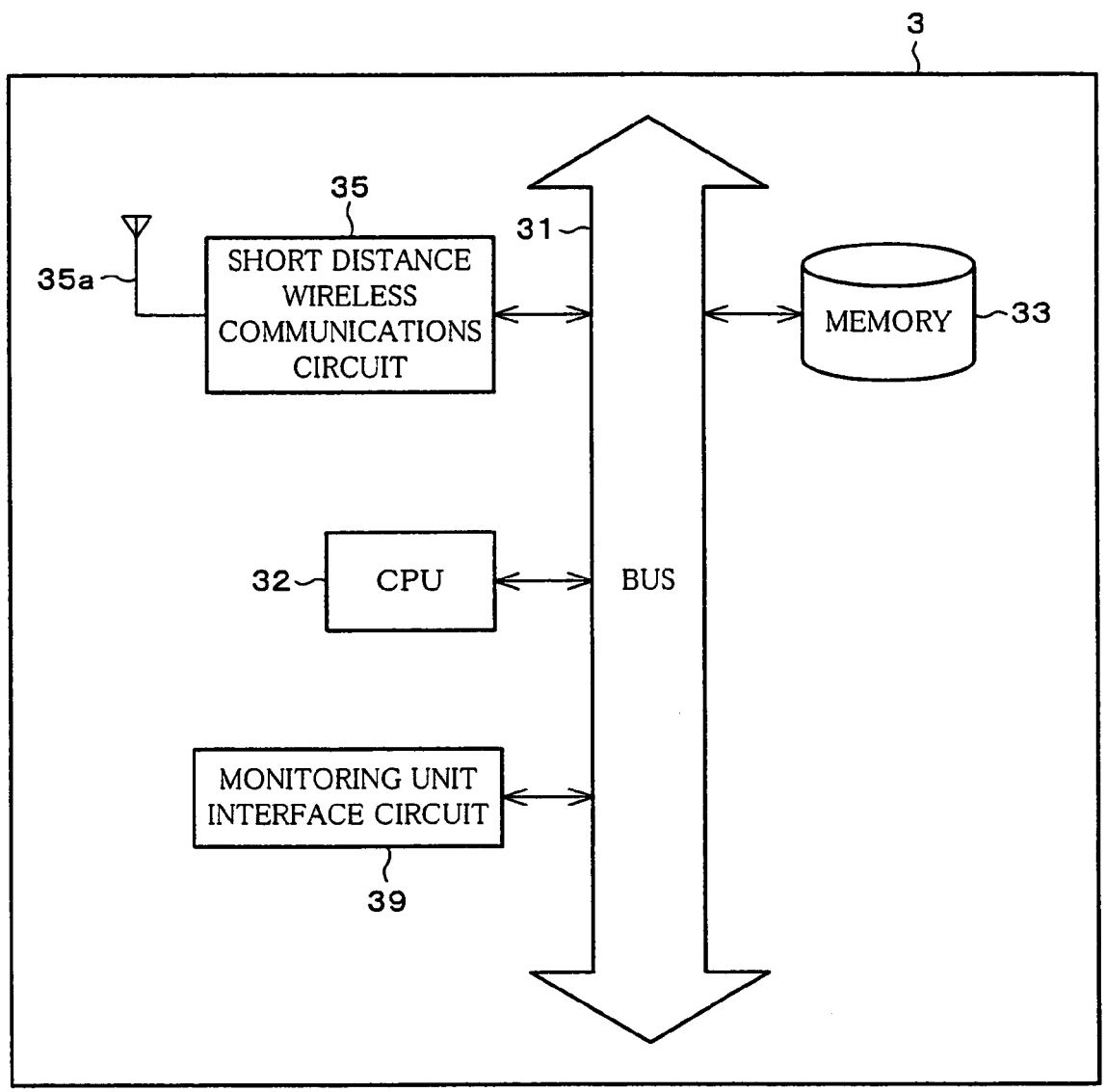
FIG. 18 is a block diagram showing an internal structure of a short distance wireless unit used in the wireless operating system of FIG. 16.

The short distance wireless unit 3 has substantially the same arrangement shown in FIG. 8. However, it is different in that, as shown in FIG. 18, a monitoring unit interface circuit 39 is provided instead of an operated target control unit interface circuit 34. Further, the CPU 32 performs various control operations of the short distance wireless unit 3 in response to a monitoring signal received from the monitoring unit 9 at the operated target control unit interface circuit 34, and transmits a radio signal to the adapter 2 via a short distance wireless communications circuit 35 and an antenna 35a. The monitoring unit interface circuit is an interface for receiving the monitoring signal from the monitoring unit 9.

The adapter 2 has the arrangement shown in FIG. 6; however, it is different in that the CPU 22 performs various control operations of the adapter 2 in accordance with the radio signal received by an antenna 25a and a short distance wireless communications circuit 25, and transmits the control signal to the mobile telephone 1 via a mobile telephone interface circuit 24 and a connector 28.

As described above, the present wireless operating system is a system for wirelessly operating the mobile telephone 1 (portable communication terminal) and primarily has the following characteristics. That is, the present wireless operating system includes: the monitoring section 95 (detecting means) for detecting the state of the monitored target 10; the short distance wireless unit 3 (transmitting-end device) including the short distance wireless communications circuit 35 and the antenna 35a (transmitting means) for allowing monitoring information indicating the state of the monitored target 10, which has been detected by the monitoring section 95, to be transmitted by short distance radio; and the adapter 2 (receiving-end device) including the antenna 25a and the short distance wireless communications circuit 25 (receiving means) for receiving the monitoring information, the CPU 22 (operation information generating means) for generating operation information for operating the mobile telephone 1 in accordance with the monitoring information received at the short distance wireless communications circuit 25, and the mobile telephone interface circuit 24 and the connector 28 (communication means) for performing direct communication with the mobile telephone 1 by being carried with the mobile telephone 1 and transmitting the operation information to the mobile telephone 1. Note that, the "direct communication" between the adapter 2 and the mobile telephone 1 is a communication performed between the adapter 2 and the mobile telephone 1 without using public lines.

With this arrangement, by transmitting to the mobile telephone 1 the operation information corresponding to the state of the monitored target 10, it is possible to operate the mobile telephone 1 in accordance with the state of the monitored target 10.

The following will describe a specific example of the present wireless operating system with reference to FIGS. 16, 5, 6, 8, 17, and 18. Note that, the operations of the monitoring unit 9, the short distance wireless unit 3, the adapter 2, and the mobile telephone 1 are controlled by the respective CPUs provided in these components.

(Specific Example of the System)

The following description will be given based on the case where the present wireless operating system is used as an onboard operating system.

Figure 19:
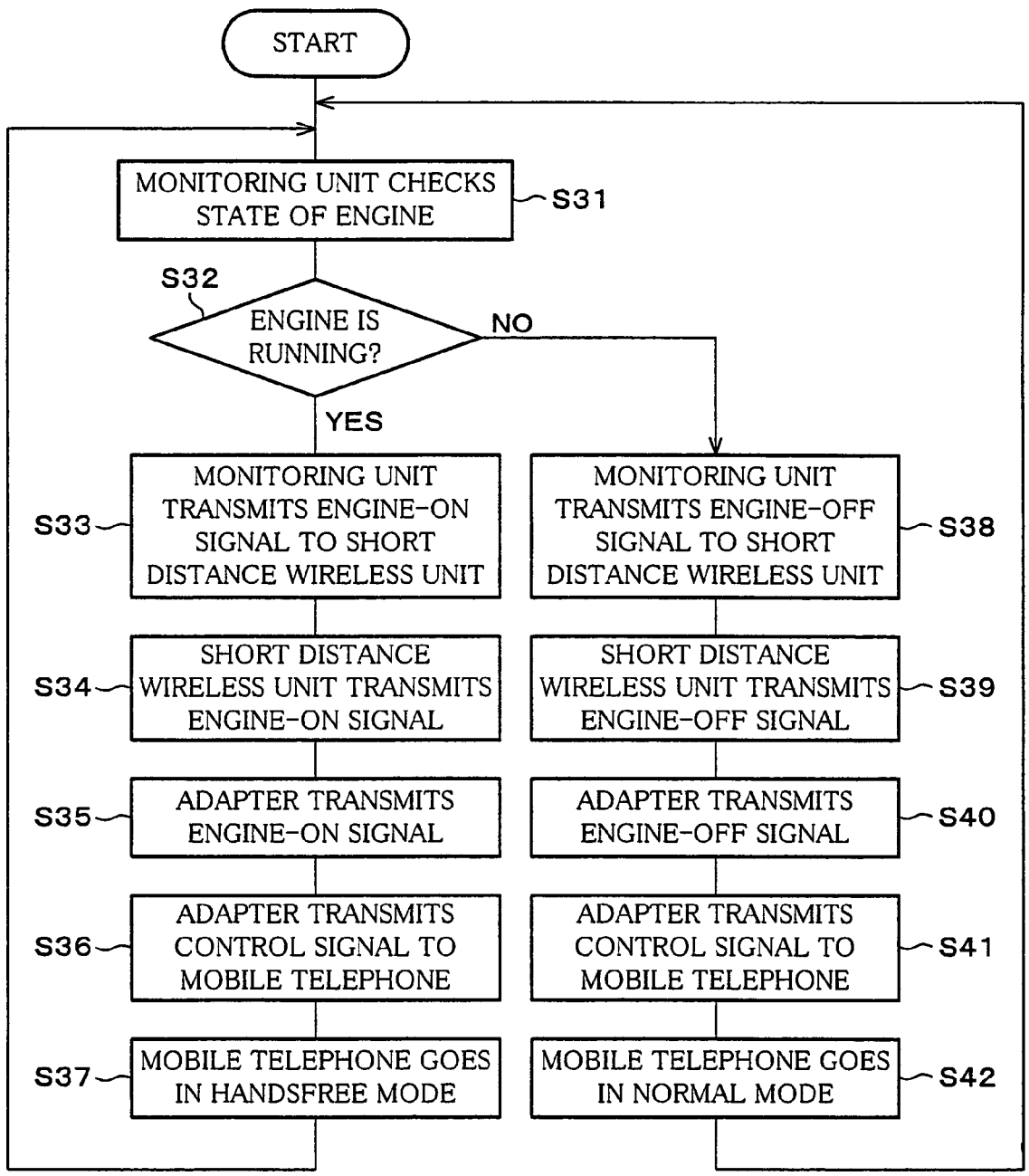
FIG. 19 is a flowchart showing a process flow of an onboard operating system as a specific example of the wireless operating system of FIG. 16.

FIG. 19 is a flowchart showing a process flow of the onboard operating system. This onboard operating system is used to operate the mobile telephone 1 in accordance with the state of a vehicle when the user gets in the vehicle, carrying the mobile telephone 1 and the adapter 2. The following will describe an example in which while the engine of the vehicle is running, it is recognized that the user is operating the vehicle, and the mobile telephone 1 is set to be in a so-called handsfree call-capable state (handsfree mode). While the engine is not running, the mobile telephone 1 is set to be in a normal call-capable state (normal mode).

The monitoring unit 9 causes the monitoring section 95 to check the vehicle for the state of the engine, i.e. whether the engine is running (step S31). In this case, the monitoring section 95 can detect the state of the engine by checking a position of an ignition key in a mechanical manner, a voltage at a predetermined location in the electric system of the vehicle, or others. Then, the CPU 92 in the monitoring unit 9 determines whether or not the engine is running (step S32).

If the engine is running, the monitoring unit 9 generates an engine-ON signal indicating that the engine is running, and the engine-ON signal is transmitted as the monitoring signal from the short distance wireless unit interface circuit 94 to the short distance wireless unit 3 (step S33). In the short distance wireless unit 3, the monitoring unit interface circuit 39 receives the engine-ON signal, and the engine-ON signal is transmitted as a radio signal from the short distance wireless communications circuit 35 to the adapter 2 (step S34). In the adapter 2, the short distance wireless communications circuit 25 receives the engine-ON signal (step S35), and in accordance with the engine-ON signal, the CPU 22 generates a control signal for setting the mobile telephone 1 to be in the handsfree mode and transmits the control signal to the mobile telephone 1 via the adapter interface circuit 24 and the connector 28 (step S36). The mobile telephone 1 receives the control signal via the connector 18 and the adapter interface circuit 14, and in accordance with the control signal, the CPU 12 sets the mobile telephone 1 to be in the handsfree mode (step S37).

In step S32, if it is determined that the engine is not running, an engine-OFF signal indicating that the engine is not running is serially transmitted from steps S38 through S40. Then, in accordance with the engine-OFF signal, the CPU 22 in the adapter 2 generates a control signal for setting the mobile telephone 1 to be in the normal mode, and the control signal is transmitted to the mobile telephone 1 via the adapter interface circuit 24 and the connector 28 (step S41). The mobile telephone 1 receives the control signal via the connector 18 and the adapter interface circuit 14, and in accordance with the control signal, the CPU 12 sets the mobile telephone 1 to be in the normal mode (step S42).

The above-described process is repeated at predetermined intervals, whereby the mobile telephone 1 is set to be in the handsfree mode while the engine is running and to be in the normal mode while the engine is not running.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A wireless operating system, which is used with a portable communication terminal, for wirelessly operating an operated target, the system comprising:

a transmitting-end device including transmitting means for allowing operation information required for an operation of the operated target to be transmitted by short distance radio, the transmitting end device being an adaptor separable from the portable communication terminal and configured to connect to the portable communication terminal; and a receiving-end device including receiving means for receiving the operation information and operating means for operating the operated target in accordance with the operation information received by the receiving means, the transmitting-end device including communication means capable of performing direct communication with the portable communication terminal by being carried with the portable communication terminal, and operation information generating means for generating the operation information in accordance with portable communication terminal information acquired from the portable communication terminal via the communication means.

2. A wireless operating system, which is used with a portable communication terminal, for wirelessly operating an operated target, the system comprising:
- a transmitting-end device including transmitting means for allowing operation information required for an operation of the operated target to be transmitted by short distance radio; and
- a receiving-end device including receiving means for receiving the operation information and operating means for operating the operated target in accordance with the operation information received by the receiving means,
- the transmitting-end device including communication means capable of performing direct communication with the portable communication terminal by being carried with the portable communication terminal, and operation information generating means for generating the operation information in accordance with portable communication terminal information acquired from the portable communication terminal via the communication means, wherein:
- the portable communication terminal information is identification information unique to the portable communication terminal,
- the operation information includes the identification information,
- the receiving-end device includes storage means for storing the identification information and determination means for determining whether the identification information received by the receiving means is identical with the identification information stored in the storage means, and
- the operating means operates the operated target in accordance with a result determined by the determination means.

3. The wireless operating system according to claim 2, wherein: the transmitting means automatically transmits the operation information when the transmitting means become ready for communication with the receiving means.

4. The wireless operating system according to claim 2, wherein:
- the portable communication terminal or the transmitting-end device includes input means for receiving an input for operating the operated target, and
- the transmitting means awaits an input to the input means before transmitting the operation information.

5. The wireless operating system according to claim 2, wherein:
- the transmitting-end device includes transmitting-end device storage means for storing transmitting-end device identification information unique to the transmitting-end device,
- the operation information further includes the transmitting-end device identification information,
- the storage means of the receiving-end device further stores the transmitting-end device identification information,
- the determination means determines whether the identification information and the transmitting-end device identification information which are received by the receiving means are identical with the identification information and the transmitting-end device identification information which are stored in the storage means, and
- the operating means operates the operated target in accordance with a result determined by the determination means.

6. The wireless operating system according to claim 5, wherein:
- the direct communication between the portable communication terminal and the transmitting-end device is wireless communication.

7. The wireless operating system according to claim 2, including:
- the portable communication terminal; and
- a center device capable of communication with the portable communication terminal via a communication network,
- the center device including center device receiving means for receiving the identification information and center device transmitting means for transmitting the received identification information via a communication network, and
- the receiving-end device including registration means for receiving identification information transmitted from the center device and storing the received identification information in the storage means.

8. The wireless operating system according to claim 1, wherein the adaptor is configured to be adaptable to a plurality of models of the portable communication terminal.

9. A wireless operating system, which is used with a portable communication terminal, for wirelessly operating an operated target, the system comprising:
- a transmitting-end device including a transmitting unit configured to allow operation information required for an operation of the operated target to be transmitted by short distance radio, the transmitting end device being an adaptor separable from the portable communication terminal and configured to connect to the portable communication terminal; and
- a receiving-end device including a receiving unit configured to receive the operation information and an operating unit configured to operate the operated target in accordance with the operation information received by the receiving unit,
- the transmitting-end device including a communication unit configured to perform direct communication with the portable communication terminal by being carried with the portable communication terminal, and an operation information generating unit configured to generate the operation information in accordance with portable communication terminal information acquired from the portable communication terminal via the communication unit.

10. A wireless operating system, which is used with a portable communication terminal, for wirelessly operating an operated target, the system comprising:
- a transmitting-end device including transmitting means for allowing operation information required for an operation of the operated target to be transmitted by short distance radio, the transmitting end device being an adaptor separable from the portable communication terminal and configured to connect to the portable communication terminal,
- the transmitting-end device for use with a receiving-end device including receiving means for receiving the operation information and operating means for operating the operated target in accordance with the operation information received by the receiving means,
- the transmitting-end device including communication means capable of performing direct communication with the portable communication terminal by being carried with the portable communication terminal, and operation information generating means for generating the operation information in accordance with portable communication terminal information acquired from the portable communication terminal via the communication means.

11. A wireless operating system, which is used with a portable communication terminal, for wirelessly operating an operated target, the system comprising:

a transmitting-end device including a transmitting unit configured to allow operation information required for an operation of the operated target to be transmitted by short distance radio, the transmitting end device being an adaptor separable from the portable communication terminal and configured to connect to the portable communication terminal, the transmitting-end device for use with a receiving-end device including a receiving unit configured to receive the operation information and an operating unit configured to operate the operated target in accordance with the operation information received by the receiving unit, the transmitting-end device including a communication unit configured to perform direct communication with the portable communication terminal by being carried with the portable communication terminal, and an operation information generating unit configured to generate the operation information in accordance with portable communication terminal information acquired from the portable communication terminal via the communication unit.

* * * * *